United States Patent [19]

Morcom

[11] 4,113,087

[45] Sep. 12, 1978

[54] PLASTIC COLLAPSIBLE ARTICLE CARRIER

[76] Inventor: Paul J. Morcom, Rte. 1, Box 235, Henderson, Tex. 75652

[21] Appl. No.: 667,679

[22] Filed: Mar. 17, 1976

[51] Int. Cl.² .............................................. B65D 85/30
[52] U.S. Cl. ................................... 206/174; 206/203
[58] Field of Search ............................... 206/170–203, 206/427, 429, 435

[56] References Cited

U.S. PATENT DOCUMENTS

| | | | |
|---|---|---|---|
| 2,575,654 | 11/1951 | Casler | 206/183 |
| 2,606,711 | 8/1952 | Forrer | 206/184 |
| 2,967,641 | 1/1961 | Versack | 206/171 X |
| 3,039,651 | 6/1962 | Lang | 206/172 |
| 3,359,873 | 12/1967 | Carle et al. | 206/203 X |
| 3,465,913 | 9/1969 | Zorn et al. | 206/172 |
| 3,587,915 | 6/1971 | Theobald et al. | 206/203 X |
| 3,625,393 | 12/1971 | Mittel | 206/173 |
| 3,815,732 | 6/1974 | Klygis et al. | 206/183 X |

*Primary Examiner*—Stephen Marcus
*Attorney, Agent, or Firm*—Richards, Harris & Medlock

[57] ABSTRACT

The specification discloses a plastic collapsible article carrier having open and collapsed positions and adapted to be formed by the injection molding of plastic within opposing dies. The article carrier includes first and second end walls parallel to one another when the carrier is in the open position. The carrier further includes first and second side walls parallel to one another, which are hingedly joined to edges of the first and second end walls to extend perpendicularly to the first and second end walls when the article carrier is in the open position. Portions of the side walls have heights less than the height of the end walls. The first side wall is vertically spaced from the second side wall such that portions of the side walls are vertically offset to enable molding thereof in opposing dies. The article carrier is divided into a plurality of receiving cellular compartments between the first and second side walls by first and second dividing walls disposed parallel to one another and parallel to the end walls. The dividing walls are hingedly joined at spaced locations between the first and second side walls. A bottom member is hingedly joined to edges of at least one of the walls, wherein the article carrier may be folded about the hinged attachments to a flat collapsed position and folded to the open position to form a plurality of open ended cellular compartments for receiving articles such as beverage bottles and the like.

18 Claims, 37 Drawing Figures

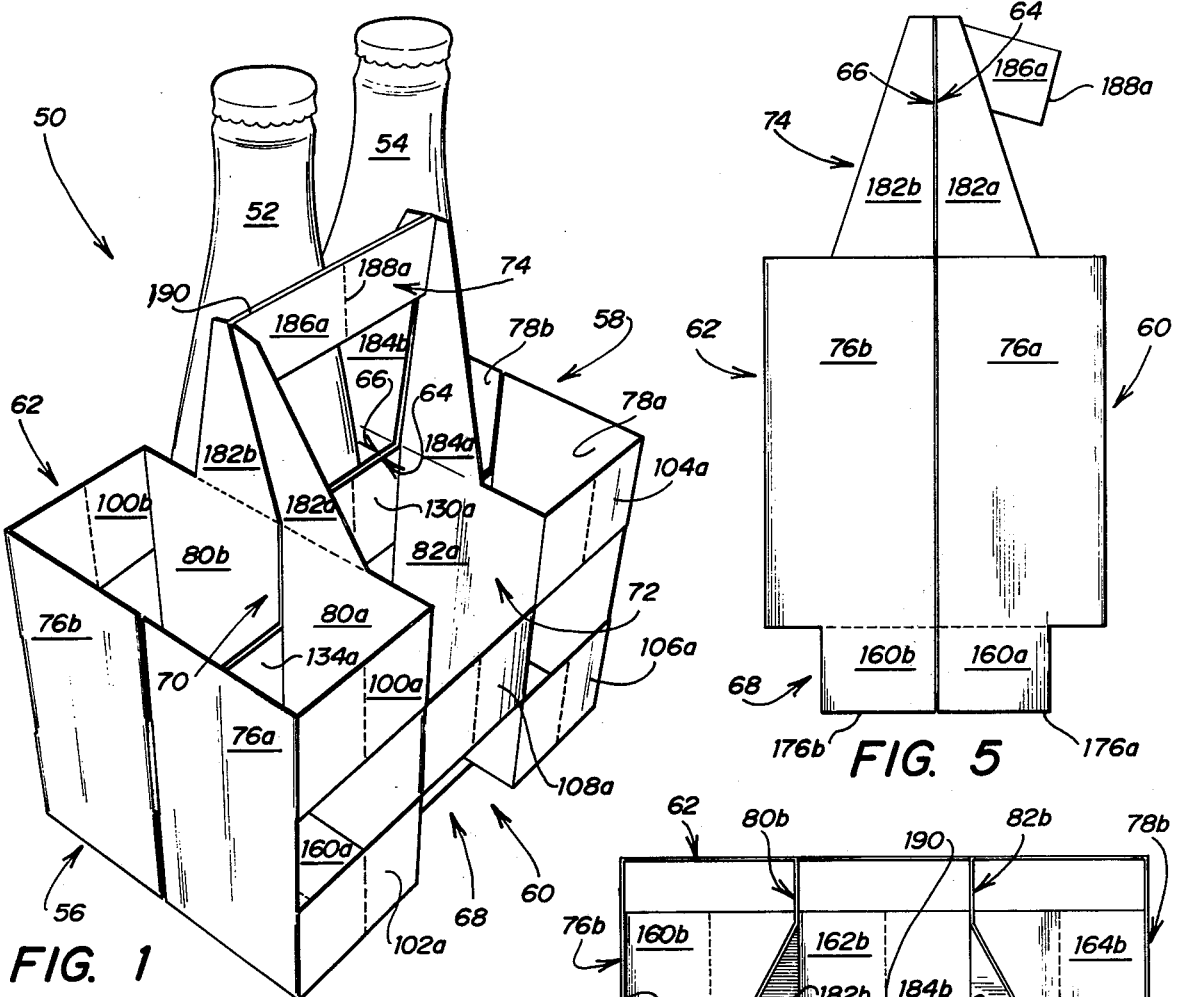

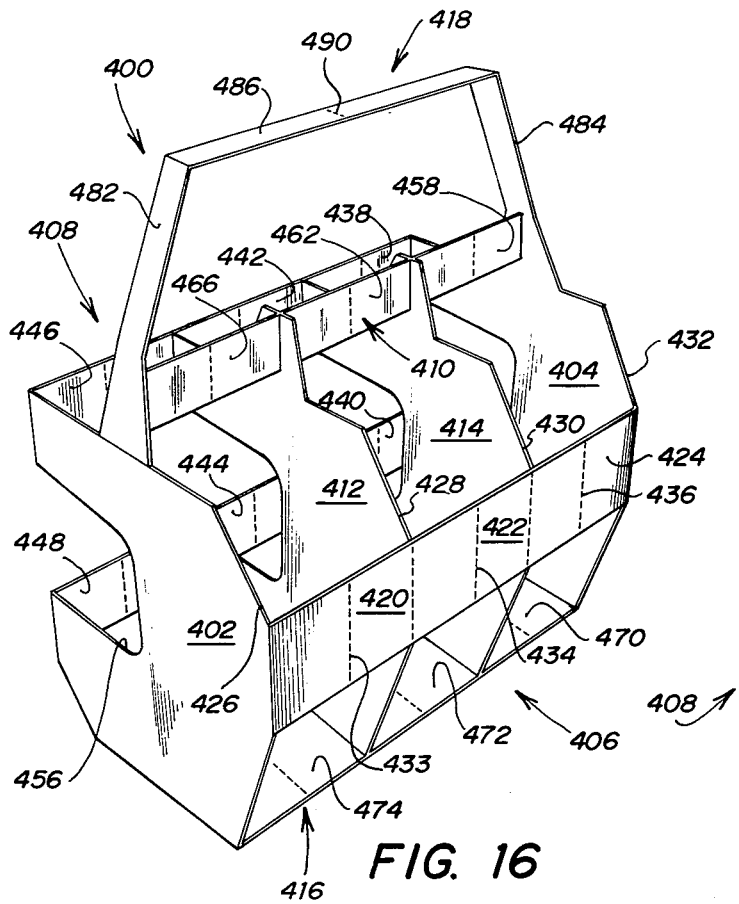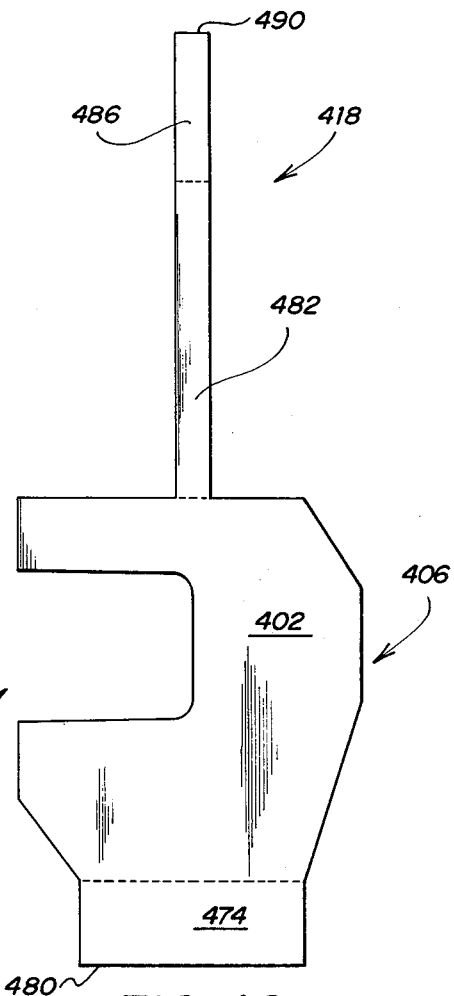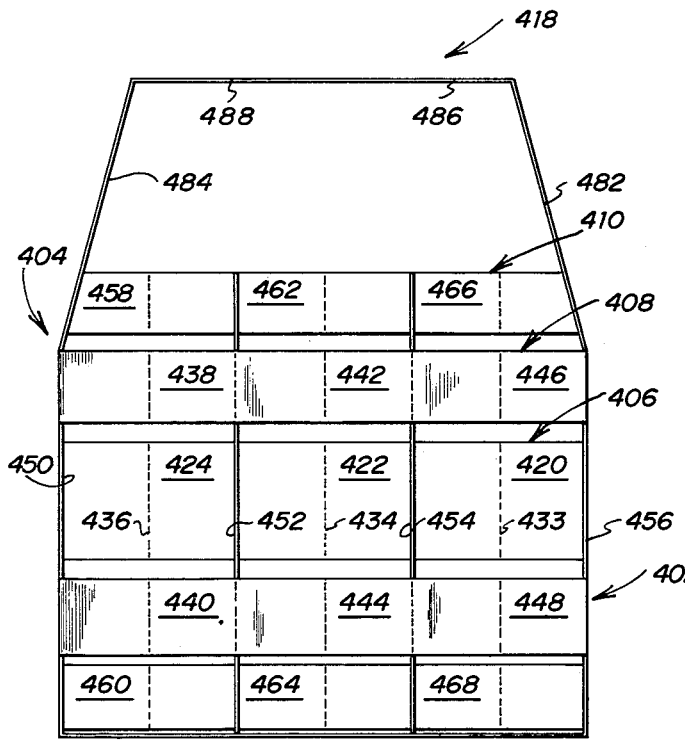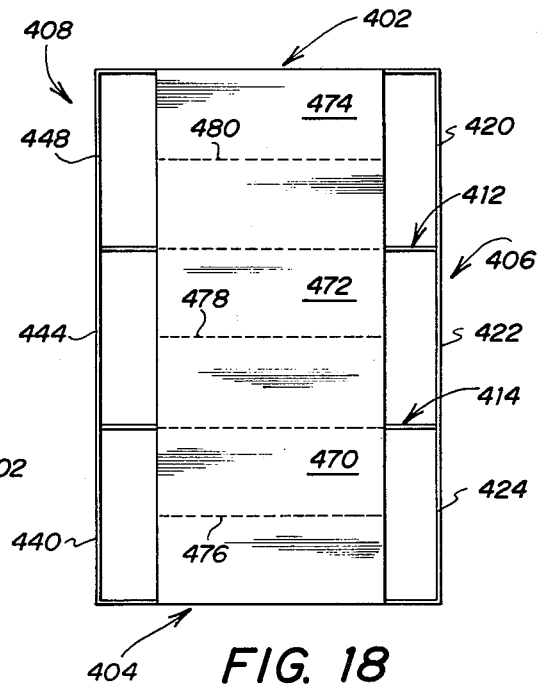
FIG. 16
FIG. 19
FIG. 17
FIG. 18

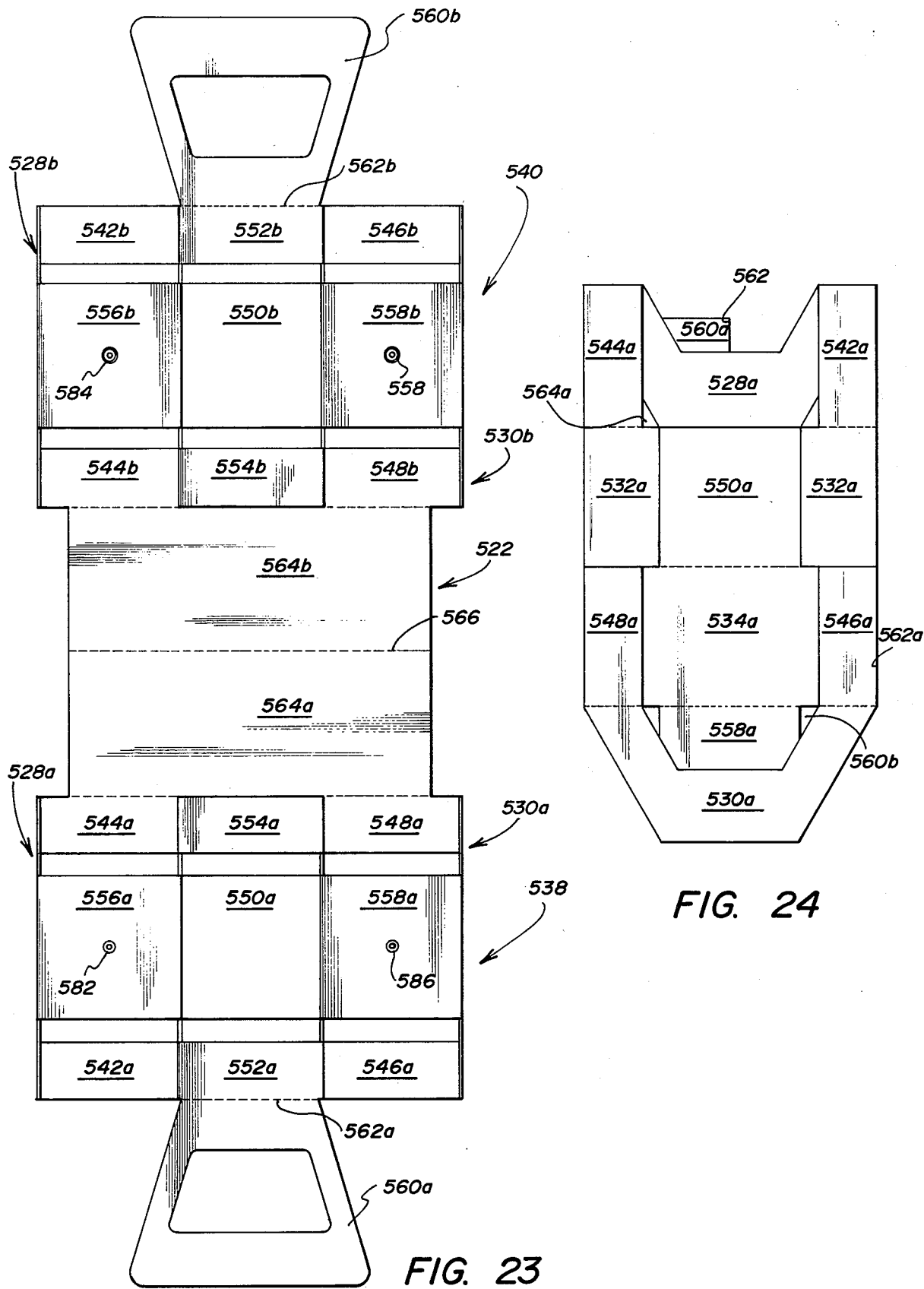

PLASTIC COLLAPSIBLE ARTICLE CARRIER

FIELD OF THE INVENTION

This invention relates to article carriers, and more particularly relates to a plastic collapsible article carrier formed by the injection molding of plastic within opposing dies.

THE PRIOR ART

Paperboard carriers are commonly used for packaging and transporting glass beverage bottles. A typical paperboard article carrier is described in U.S. Pat. No. 3,128,906 issued Apr. 14, 1964, wherein several paper panels are foldably joined and affixed using glue. The gluing operation, requiring numerous glue joints and expensive machinery, and the substantial amount of paperboard to assure a structurally sound carrier, results in a manufacturing process and product that is quite costly. Because of this cost, users of article carriers traditionally reuse carriers in the cycle from beverage manufacture to consumer and back to beverage manufacture. The reuse results in the deterioration of the paperboard carrier. Further, if the carrier becomes wet with moisture, the paperboard carrier may become structurally unsound and unusable.

Such carriers also are required to fold and collapse into a small volume to facilitate transportation and storage. The many folds and thickness of paperboard often results in a folded thickness and overall folded size that restricts the economic storage and shipping of paperboard carriers.

Although substitution of plastic material for paperboard would minimize several problems in prior carriers, the present design of carriers makes the substitution of materials technically unfeasible. The present design of article carriers does not allow for the necessary draft angles in plastic molds in order to manufacture the carriers. A further problem encountered in the molding of conventional article carriers out of plastic in the present industry is that several molding operations must be performed on the carrier in order to provide the necessary folds and contours in the finished product. Also, a large quantity of plastic is required to form relatively thick walls to provide a structurally sound carrier, thereby resulting in an expensive and undesirably heavy carrier.

SUMMARY OF THE INVENTION

The present invention is directed to a plastic collapsible article carrier which substantially eliminates or reduces the disadvantages associated with prior art article carriers. The present article carrier can be economically manufactured by the injection molding of plastic within opposing dies to form a structurally sound, lightweight plastic article carrier that can be folded and collapsed for ease in storage and transportation and used for longer periods of time than the carriers associated with the prior art.

In accordance with the present invention, a plastic collapsible article carrier having open and collapsed positions and adapted to be formed by the injection molding of plastic within opposing dies includes first and second end walls parallel to one another when the article carrier is in the open position. The carrier further includes first and second side walls parallel to one another, which are hingedly joined to edges of the first and second end walls to extend perpendicularly to the first and second end walls when the article carrier is in the open position. Portions of the side walls have heights less than the height of the end walls. The first side wall is vertically spaced from the second side wall such that the walls are vertically offset to enable molding thereof in opposing dies. The carrier further includes first and second dividing walls, parallel to one another and parallel to the end walls. The dividing walls are hingedly joined at spaced locations between the first and second side walls to form a plurality of receiving cellular compartments between the first and second side walls within the article carrier. A bottom member is hingedly joined to edges of at least one of the walls, wherein the article carrier may be folded about the hinged attachments to a flat collapsed portion and folded to the open position to form a plurality of open ended cellular compartments for receiving articles.

In accordance with another aspect of the present invention, a mold used with a plastic injection molding machine for manufacturing a plastic collapsible article carrier having hinged end, side and bottom members includes a first die having a first plurality of alternating cavity and core members. The mold further includes a second die having a second plurality of alternating cavity and core members which are offset from the first plurality of members. When the first and second dies are mated and aligned with one another, the core members of the first die align and mate with the cavity members of the second die. The cavity members of the first die thus align and mate with the core members of the second die to form a collapsible article carrier which has side walls vertically offset from one another.

DESCRIPTION OF THE DRAWINGS

For a more complete understanding of the present invention and advantages thereof, reference is now made to the following description, taken in conjunction with the accompanying drawings, in which:

FIG. 1 is a perspective view of the plastic collapsible article carrier showing the preferred embodiment of the present invention;

FIG. 2 is a side elevation view of the preferred embodiment of the present invention;

FIG. 3 is a bottom plan view of the preferred embodiment of the present invention;

FIG. 4 is a top plan view of the preferred embodiment of the present invention;

FIG. 5 is a collapsed end view of the preferred embodiment of the present invention;

FIG. 16 is a perspective view of a second embodiment of the present invention;

FIG. 17 is a side elevation view of a second embodiment of the present invention;

FIG. 18 is a bottom plan view of a second embodiment of the present invention;

FIG. 19 is a collapsed end view of a second embodiment of the present invention;

FIG. 23 is a side elevation view of a third embodiment of the present invention in the molded configuration;

FIG. 24 is a collapsed end view of a third embodiment of the present invention;

DESCRIPTION OF THE PREFERRED EMBODIMENT

Figure 6:
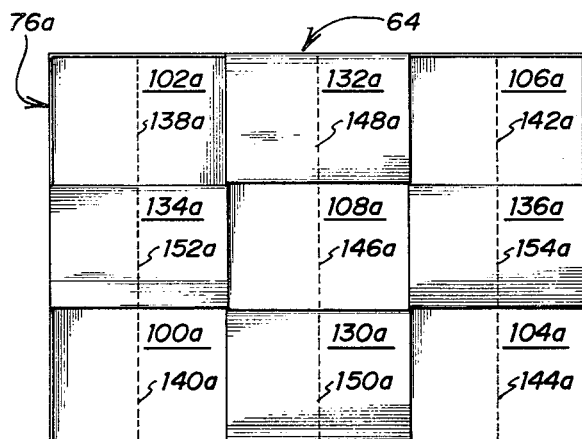
FIG. 6 is a side elevation view of the preferred embodiment of the present invention in the molded configuration.

FIGS. 1–6 illustrate a preferred embodiment of the present plastic collapsible article container or carrier which is generally referred to by the numeral 50. The carrier 50 is shown in the open position in FIG. 1 with glass beverage bottles 52 and 54 positioned within two of the receiving cellular compartments within the carrier. The article carrier 50 comprises a first end wall member generally designated as numeral 56, and a second end wall member parallel to the first end wall 56 generally designated as numeral 58. A first side wall generally designated as 60 is hingedly joined between first and second end wall members 56 and 58, and is perpendicular to the end walls of the article carrier when the article carrier is in the open position. A second side wall 62 is hingedly joined on the opposite side of end walls 56 and 58 and is parallel to the first side wall 60.

A first medial wall 64 is located parallel to side walls 60 and 62 and perpendicular to end walls 56 and 58. A first medial wall 64 is perpendicular to the end walls 56 and 58 when the article carrier is in the open position. A second medial wall 66 is located parallel to second side wall 62 and perpendicular to ends 56 and 58 and is disposed in a side-by-side relationship with the first medial wall 64. When the container is in the open position, second medial wall 66 is perpendicular to end walls 56 and 58.

The article carrier further includes a bottom member generally referred to as 68 which is hingedly joined to end walls 56 and 58. The article carrier 50 is subdivided into cellular compartments using dividing wall members generally referred to as 70 and 72 which are parallel to one another and parallel to end walls 56 and 58. A handle member generally referred to as 74 is also a part of the article carrier for ease in transporting the article carrier when loaded.

The article carrier 50 of the present invention is manufactured using an injection molding process. In this process the carrier is molded in halves. First end wall 56 in the molded configuration is composed of first end panels 76a and 76b. Similarly, second end wall member 58 is composed of second end panels 78a and 78b. The dividing wall members are similarly formed in half sections such that dividing wall member 70 is formed in sections 80a and 80b and dividing wall member 72 is formed in sections 82a and 82b. It therefore can be seen that a first half generally referred to as 84 of the article carrier comprises first side wall 60, first end panel 76a, first medial wall 64, second end panel 78a and bottom member 68. The dividing walls 80a and 82a divide first half 84 into three cellular compartments for receiving beverage containers. Similarly, the second half generally referred to as 86 of the article carrier 50 comprises second side wall 62, first end panel 76b, second medial wall 66, second end panel 78b and bottom member 68. The dividing walls 80b and 82b divide the second half 86 of the article carrier 50 into three cellular compartments for receiving beverage containers. Two of the compartments are occupied by beverage bottles 52 and 54 in FIG. 1.

The article carrier 50 composed of a first half 84 and second half 86 is molded as an integral unit. Although the elements and components will be specifically identified and discussed as individual units, the entire structure is an integral unit. For ease in identification and discussion throughout the specification, corresponding elements and components of a first side and a second side of the embodiments of the article carriers will be numbered using identical numerals and distinguished by the letters "a" and "b". For example, elements and components of first side 84 will be referred to by a numeral followed by the letter "a". The corresponding component or element in second half 86 will be referred to by that same numeral followed by the letter "b".

Referring now to FIG. 2, a side view of the article carrier 50 is shown viewed from first side wall 60. FIG. 2 shows first side wall 60 and first medial wall 64, both of which comprise a plurality of strip members. As will be subsequently described in greater detail, the strip members have heights less than the height of the end walls 56 and 58 and are vertically displaced from one another to facilitate molding by the injection molding process. First side wall 60 and the corresponding second side wall 62 of the second half 86 of the article carrier includes first upper vertical strip member 100a, first lower vertical strip member 102a, second upper vertical strip member 104a, second lower vertical strip member 106a and central vertical strip member 108a.

First upper vertical strip member 100a is connected using hinges 110a and 112a to the edge 114a of first end panel 76a and to the edge 116a of dividing wall 80a. These hinge connections to the edges of first end panel 76a and the edge 116a of dividing wall 80a are made using plastic "living hinges". The formation and operation of these hinges will be further discussed in connection with FIGS. 7 and 8. The hinges are molded to be an integral part of the article carrier 50 and form a continuous surface between individual strip members, end panels and dividing walls.

In a similar manner, first lower vertical strip member 102a is hingedly connected to edge 114a of first end panel 76a and edge 116a of dividing wall 80a. The first upper and lower vertical strip members 100a and 102a are vertically displaced from one another on first side wall 60, to enable molding as will be subsequently described. Second upper vertical strip member 104a is located on first side wall 60 and parallel to first upper vertical strip member 100a. Second upper vertical strip member 104a is hingedly joined between dividing wall 82a and second end panel 78a. Second upper vertical strip member 104a is joined using a living hinge 118a, joining second upper vertical strip member 104a to edge 120a of dividing wall 82a. The second end of second upper vertical strip member 104a is hinged using hinge 122a to the edge 124a of second end panel 78a.

In a similar manner, second lower vertical strip member 106a is hingedly joined and extends between dividing wall 82a and second end panel 78a. Second lower vertical strip member 106a is positioned parallel to first lower vertical strip member 102a and is vertically displaced on the first side wall 60 from the second and upper vertical strip member 104a.

The central vertical strip member 108a is displaced intermediate between vertical strip members 100a and 102a on the first side wall 60. Central vertical strip member 108a is also hingedly attached and extends between dividing walls 80a and 82a. Central vertical strip member 108a is positioned such that its upper edge 126a is slightly below edge 128a of first upper vertical strip member 100a. Although not specifically numbered on FIG. 2, each junction between a vertical strip member and either an end panel or dividing wall is made by a living hinge to enable collapse of the carrier.

First medial wall 64 also shown in FIG. 2 includes upper vertical strip members 130a, lower vertical strip member 132a, first central vertical strip member 134a and second central vertical strip member 136a. These strip members are arranged such that they are vertically displaced from one another on first medial wall 64 and vertically offset from the vertical strip members which comprise first side wall 60. Upper vertical strip member 130a is hingedly joined and extends between the dividing walls 80a and 82a along their respective edges opposite edges 116a and 120a. Vertically displaced on first medial wall 64 is lower vertical strip member 132a, which is also hingedly attached and extends between dividing walls 80a and 82a.

First central vertical strip member 134a is hingedly joined and extends between first end panel 76a and dividing wall 80a. First central vertical strip member 134a is displaced to be intermediate between strip members 130a and 132a on first medial wall 64. Parallel to first central vertical strip member 134a is second central vertical strip member 136a, which is hingedly joined and extends between dividing wall 82a and second end panel 78a. The overall displacement of the vertical strip members on first medial wall 64 are seen to be offset from the vertical strip members on first side wall 60. This configuration enables the article carrier 50 to be molded and formed by the injection molding of plastic within opposing dies. As will be shown, the offset construction of the vertical strip members relative to first side wall 60 and first medial wall 64 permit opposing cavity and core members of a die to simultaneously form the plurality of strip members in these walls.

To provide for the collapsible feature of the article carrier 50, each vertical strip member is further hinged intermediate of the points of attachment. First upper vertical strip member 100a includes a hinge 138a and first lower vertical strip member 102a contains a hinge 104a. Hinges 138a and 140a allow the article carrier to collapse, such that first end panel 76a and dividing wall 80a, in a collapsed position, will contact one another. In addition, these hinge members permit vertical strips 100a and 102a to be folded in a collapsed position and contained between and within first end panel 76a and dividing wall 80a. These hinged strips permit the collapsible carrier to be folded to a small volume for ease in transporting the empty carrier.

Vertical strip members 104a and 106a also are hinged intermediate of their points of attachment, such that second upper vertical strip member 104a contains hinge 142a and second lower vertical strip member 106a contains hinge 144a. Central vertical strip member 108a of first side wall 60 is also intermediately hinged and contains hinge 146a. Similarly, the horizontal strip members of first medial wall 64 are also intermediately hinged such that upper vertical strip member 130a contains hinge 148a, lower vertical strip member 132a contains hinge 150a, first central vertical strip member 134a contains hinge 152a and second central strip member 136a contains hinge 154a.

The hinged vertical strip members permit the entire first half 84 of the article carrier to collapse such that first end panel 76a, dividing wall 80a, dividing wall 82a and second end panel 78a can fold towards each other in an accordian-like fashion. The second half 86 of article carrier 50, containing second side wall 62 and second medial wall 66, is comprised of vertical strip members in an identical fashion to first side wall 60 and first medial wall 64.

Referring now to FIG. 3, the bottom member generally referred to as 68 of article carrier 50 is shown. The bottom member for the first half of the article carrier 84 is composed of horizontal strip members 160a, 162a and 164a. Similarly, the bottom member for the second half 86 of article carrier 50 is composed of horizontal strip members 160b, 162b and 164b. Horizontal strip member 160a is hingedly joined using living hinges and extends between the bottom edge 168 of first end panel 76a and the bottom edge 170a of dividing wall 80a. The second horizontal strip member 162a extends between the bottom edge 170a of dividing wall 80a and the bottom edge 172a of dividing wall 82a. The third horizontal strip member 164a is similarly hingedly joined and extends between the bottom edge 172a of dividing wall 82a and the bottom edge 174a of second end panel 78a.

The six bottom horizontal strip members which compose bottom member 68 in addition are hinged intermediate of the edges of attachment. Hinge 176a is formed in horizontal strip member 160a and is centrally displaced relative to the bottom edges 168a and 170a of attachment. In a similar manner, hinges 178a and 180a are intermediately located in horizontal strip members 162a and 164a, respectively. The hinges 176a, 178a and 180a permit the first half 84 of the article carrier to fold in a collapsed position, such that the bottom, first side wall 60 and first medial wall 64 can be compressed into a small volume.

The article carrier 50 also includes a handle member generally referred to as 74. The handle is composed of supporting members 182a and 184a which are hingedly joined to dividing walls 80a and 82a, respectively. Attached to the upper ends of handle supports 182a and 184a is handle strip 186a. Handle strip 186a is hingedly joined at its ends to handle supports 182a and 184a and is also intermediately hinged at hinge 188a, such that the handle strip 186a is foldable about hinge 188a.

FIG. 4 is a top plan view of the article carrier in which the handle member 74 may be seen to include the handle supports 182a and 184a, which extend diagonally from dividing walls 80a and 82a.

FIG. 5 is a collapsed end view of the article carrier 50 in its collapsed, folded position. The horizontal bottom strip members 160a and 160b are shown folded and extending downward from the end panels 76a and 76b, respectively. The side wall and medial wall vertical strip members are folded along their intermediate hinges and hinged points of attachments and are contained within the article carrier as so not to be visible when the carrier is folded. Alternatively, the bottom strip members can be folded about their intermediate hinges such that the bottom strip members will be contained within the folded container and the lower horizontal strip members of the side walls 60 and 62 will be folded extending outwardly from the collapsed carrier.

Referring now to FIG. 6, a side view of the article carrier in the configuration in which it is molded is illustrated. The view is from the inside of the open article carrier, such that the top surface of first half 84 is first medial wall 64 and the top surface of the second half 86 of the article carrier is second medial wall 66. The halves 84 and 86 are hingedly joined through the handle member 74 along hinge 190. The carrier halves 84 and 86 are symmetrical about hinge 190 and in the operative position are folded about hinge 190 such that medial walls 64 and 68 are coincident. The carrier halves will be simultaneously formed in a single mold in a manner to be subsequently shown.

Figure 7:
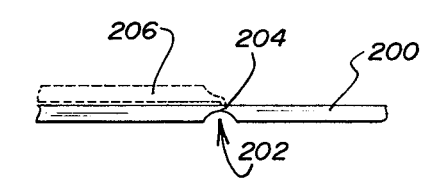
FIG. 7 is an illustration of a hinge member.
Figure 8A:
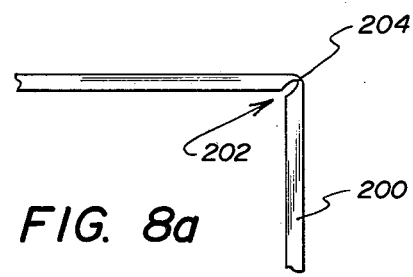
FIGS. 8a and 8b are illustrations of a folded hinge member.
Figure 8B:
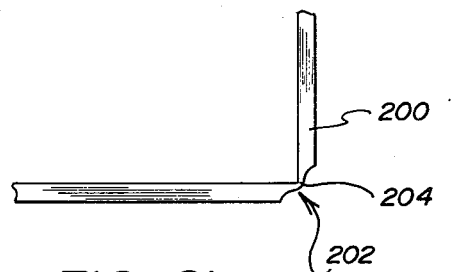

Referring to FIGS. 7, 8a and 8b, examples of a living hinge and the folded configurations which the hinges can form are illustrated. In FIG. 7 a cross-sectional view of a plastic member 200 formed by injection molding is shown. The member 200 contains a living hinge 202 formed within it. The living hinge 202 is circular in configuration and forms an area 204 which is thinner in thickness than the overall thickness of member 200. The member is foldable about the area 204 such that one half of the plastic member 200 can be folded 180° into the folded position shown as 206. This folded configuration demonstrates the folding of the intermediate hinges contained in the vertical and horizontal bottom strip members of the article carrier's sides and bottom when the carrier is in the collapsed position.

The configurations shown in FIGS. 8a and 8b are illustrative of the hinged connections between the vertical strip and horizontal bottom strip members with the end walls and dividing walls of the article carrier. FIG. 8a shows plastic member 200 in a 90° folded configuration with the hinge 202 forming the interior side of the angle. FIG. 8b shows a 90° folded configuration of member 200 with the hinge 202 forming the exterior side of the 90° bend. The process of molding the living hinges in the plastic members is further discussed with respect to FIGS. 9 through 11 which illustrate the dies used in the injection molding process of forming the collapsible article carrier.

Upon removal of the article carrier from the mold, the living hinges should be flexed to strengthen the hinge junctions. The article carriers should be stored in the folded position to establish a "memory" in the plastic material forming the hinges.

Figure 9:
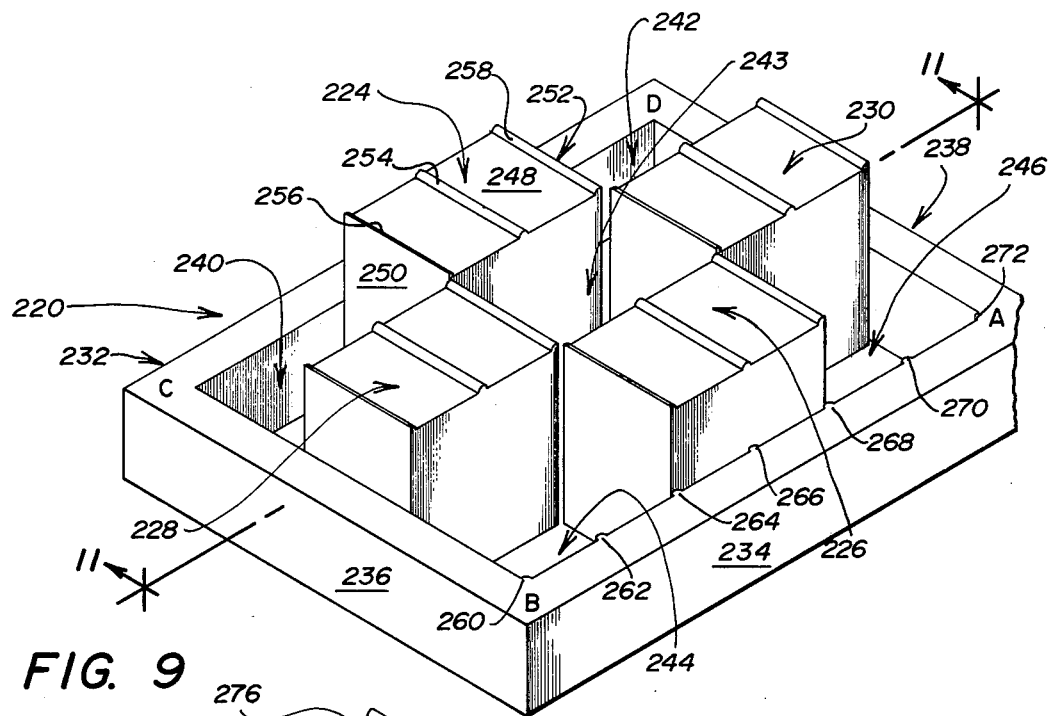
FIG. 9 is a perspective view of the first half of the mold of the preferred embodiment of the present invention.
Figure 10:
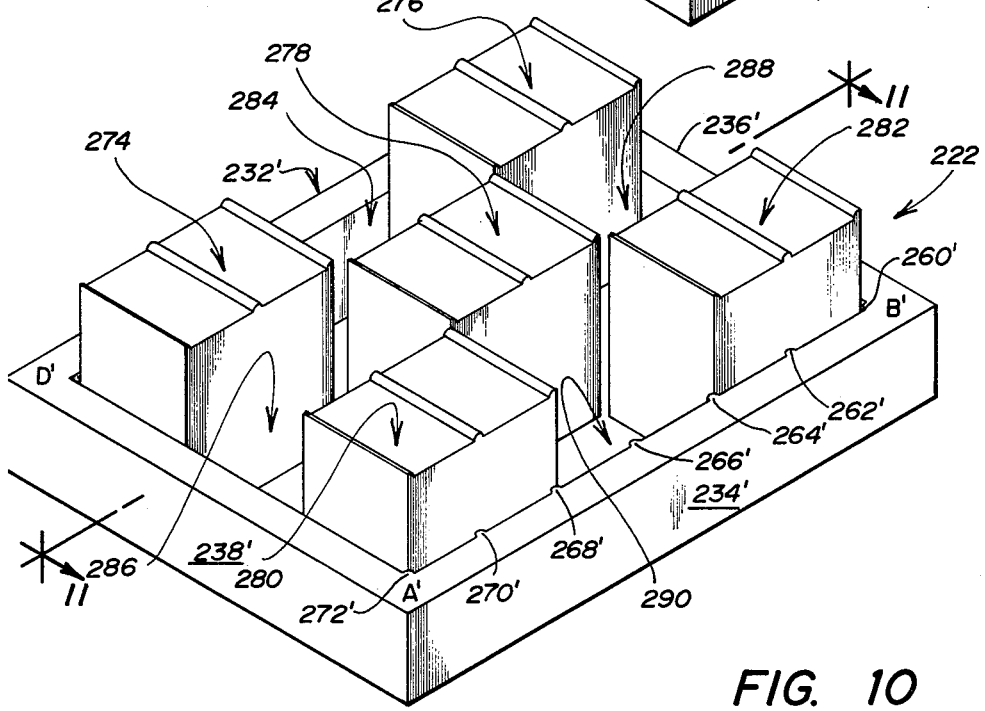
FIG. 10 is a perspective view of the second half of the mold of the preferred embodiment of the present invention.

FIGS. 9 and 10 illustrate a preferred embodiment of the molds used to form the first half 84 of the article carrier 50. In practice, a similar mold will be formed adjacent the illustrated mold, but this mold has been omitted for simplicity of explanation. FIG. 9 illustrates die 220 with its corners identified by the letters A, B, C and D. FIG. 10 illustrates die 222 having corresponding corners A', B', C' and D'. When die 220 is mated to die 222, the corresponding corners will coincide, such that corner A of die 220 will be coincident to corner A' of die 222 in order to mold first half 84 of the article carrier. Referring to FIG. 9, die 220 is composed of core members or elevated blocks 224, 226, 228 and 230. The outer surface of die 220 is defined by its sides 232 and 234. The ends of the die are 236 and 238. The interior surfaces of the die sides and ends, in combination with the core members, define a plurality of cavities or recesses within the die which include 240, 242, 243, 244 and 246.

The top planar surface of each core member includes three convex hinge projections. For example, with respect to core 224, the upper surface 248 is defined by sides 250 and 252. A central convex hinge projection 254 is disposed centrally on upper surface 248 and parallel to sides 250 and 252 of the block 224. In addition, convex hinge projections 256 and 258 extend vertically from upper surface 248 along the ends of the surface. The three projections 254, 256 and 258 in conjunction with cavity member 284 of die 222 form the living hinges 112a, 118a and 148a in upper vertical strip member 130a contained in first medial wall 64 of the article carrier 50. In a like manner, each top planar surface of the core members 226, 228 and 230 have three convex hinge projections. Spaced along the interior surface of die side wall 234 are vertical convex hinge projections 260, 262, 264, 266, 268, 270 and 272. These hinge projections in part form the living hinges contained in the bottom horizontal strip members 160a, 162a and 164a in the bottom member 68 in the article carrier 50.

FIG. 10 illustrates the second half of the mold used to form first half 84 of the article carrier 50. The die 222 is the complimentary half to the die 220 shown in FIG. 9. When the halves 220 and 222 are mated, end 236 of die 220 will lie opposite end 236' of die 222 and side 234 of die 220 will lie opposite side 234' of die 222. The die 222 also includes a plurality of core members. These core members include 274, 276, 278, 280 and 282. The core members and side walls of the die 222 further define a plurality of recesses or cavities, which include 284, 286, 288 and 290.

The top planar surfaces of the core members 274, 278, 280 and 282 contain three convex hinge projections which form the hinges and hinged edges in first side wall 60 of the collapsible carrier 50. These projections are similar to those previously described with respect to FIG. 9 and die half 220.

In the process of molding the first half 84 of the article carrier 50, the die halves 220 and 222 of the mold are mated in such a way that core members 278 of die 222 is inserted into cavity 243 of die 220. In a similar fashion, the other core members of die 222 are inserted into corresponding cavities of die 220. The mating of the die halves is further illustrated in FIG. 11, illustrating a cross-sectional view taken along sectional lines 11—11 of FIGS. 9 and 10.

Figure 11:
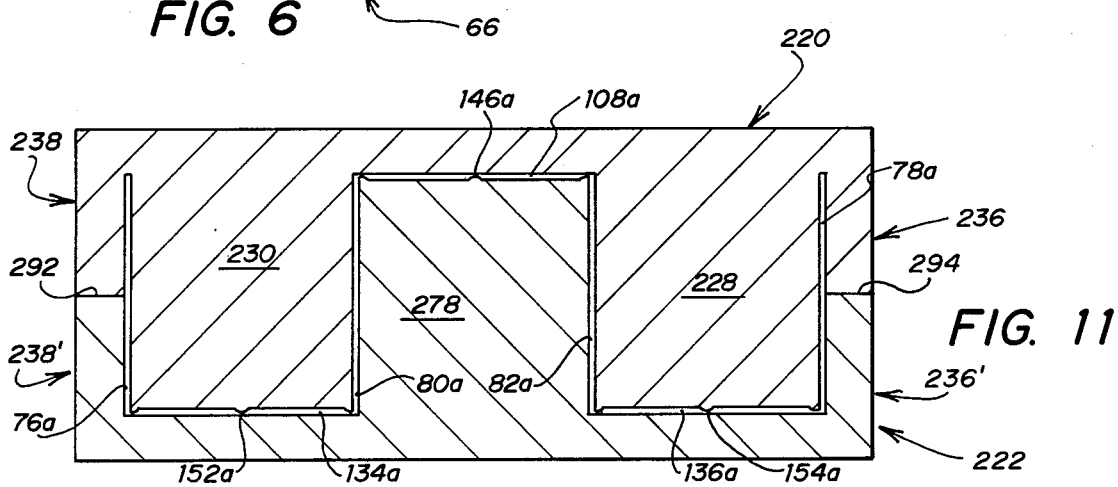
FIG. 11 is a sectional view taken generally along the sectional lines 11—11 of the mold of the present invention in FIGS. 9 and 10.

FIG. 11 illustrates core member 230 positioned in cavity 286 in die half 222. Similarly, core member 278 of die half 222 is positioned in cavity 243 of die half 220. The sides of the die halves meet at surface 292 along end 238 and at surface 294 along end 236. The gap existing between the mated die halves 220 and 222 is filled with the plastic material during the injection molding process. The gap defines various elements of the first half 84. The space or gap between core 230 and the bottom of die 222 forms first central vertical strip member 134a and hinge 152a contained in first medial wall 64. The gap between core 228 and the bottom of die 222 forms second central vertical strip member 136a and hinge 154a of medial wall 64 in the first half 84 of the article carrier 50. The gaps between the cores 230 and 278, and between cores 278 and 228 form the dividing walls 80a and 82a, respectively. The end panel walls 76a and 78a are formed in the gaps created between cores 230 and 228 and their respective sides of the die.

The interior of side 234' of die 222 includes a plurality of vertical convex hinge projections corresponding to those projections in the interior side of 234 of die 220. The combination of these vertical projections in the die halves produce the hinges contained in the bottom member 68 of the article carrier 50.

In the process of injection molding articles, after the plastic has been injected and the compression stage completed, the mold will separate along the parting line of the die. The molded article, will as it cools, tend to shrink and conform to the core members of the die. This creates a problem in removing the molded article from the die in that it tends to shrink and stick to the core members. To overcome this problem, the core member walls and the walls of the cavities are tapered with a draft angle so that when the molded article cools it will force itself off from the core members. All surfaces perpendicular to the parting line are tapered. As the molded article cools, the draft angle permits the article to slide off of the core member as it contracts. The draft angle used in the present invention as dictated by good design practice may be, for example, approximately one degree (0.017/inch). Although not clearly shown in FIGS. 9 through 11, each side wall of the core members and interior sides of the die are tapered 1° or slightly more towards the center of the die to permit the molded halves of the article carrier to slide out of the mold as the die halves are separated.

The molds used to form the article carriers of the present invention are also designed to permit sequence molding. Several molds can be arranged side by side to permit the molding of a plurality of article carriers at the same time.

The plastic material used to mold the article carriers according to the present invention is a thermoplastic type material which is characterized as having the ability to be repeatedly softened by heat and hardened by cooling. Typical of the thermoplastic family are the styrene polymers and co-polymers, acrylics, cellulosics, polyethylenes, polypropylenes, vinyls, nylons and the various fluorocarbon materials. In the preferred embodiments of the present invention, a polypropylene thermoplastic material will be used to injection mold the article carriers. Also characteristic of thermal plastics is that previously molded materials can be reused. If the article carriers become damaged during use, the carrier can be ground-up, the resulting material called "regrind", and used in combination with new material or by itself to mold new article carriers.

Figures 12, 13, 14, 15:
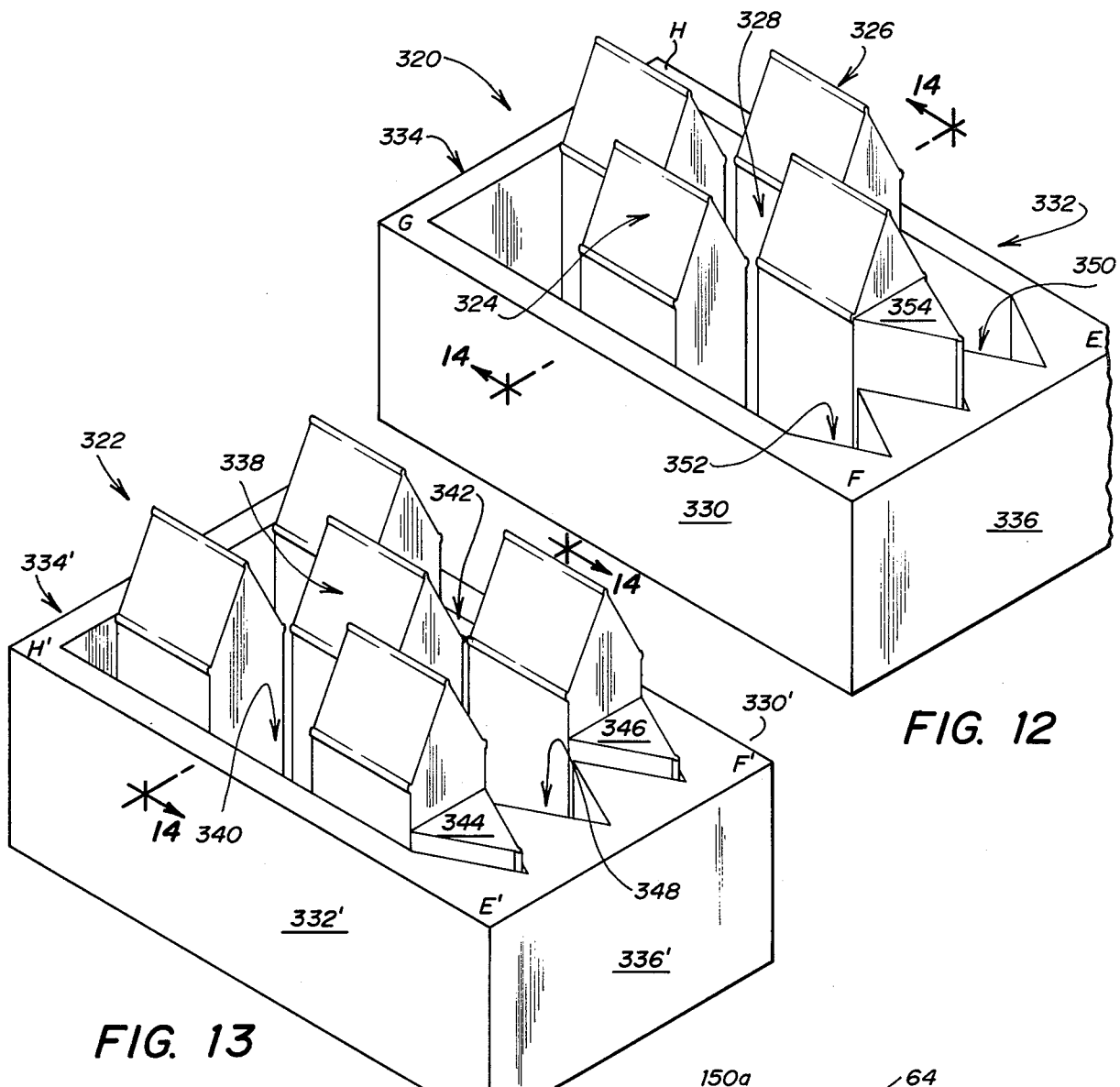
FIG. 12 is a perspective view of the first half of the mold of a second embodiment of the present invention.
FIG. 13 is a perspective view of the second half of the mold of a second embodiment of the present invention.
FIG. 14 is a sectional view taken generally along the sectional lines 14—14 of a second embodiment of the mold of the present invention in FIGS. 12 and 13.
FIG. 15 is a perspective view of the preferred embodiment of the present invention as molded using a second embodiment of the molds of the present invention.

FIGS. 12-14 illustrate a second embodiment of the molds used to form the first half 84 of the article carrier 50. In practice, a similar mold will be formed adjacent the illustrated molds, but this mold has been omitted for simplicity of explanation. FIG. 12 illustrates die 320 with its corners identified by the letters E, F, G and H. FIG. 13 illustrates die 322 having corresponding corners identified as E', F', G' and H'. When die 320 is mated to die 322 to form the completed mold used to form the first half 84 of article carrier 50, the identified corners will coincide, such that corner E of die 320 will be opposite corner E' of die 322. This embodiment of the mold will form the article carrier 50 in a position in which the strip members are preformed in a folded position rather than in a flat position as formed by the mold illustrated in FIGS. 9-11.

The top surfaces of the core and cavity members are triangular in shape to form the side and bottom strip members folded at approximately a 60° angle during molding. This molding technique allows the mold to have an overall volume that is smaller when compared to the mold shown in FIGS. 9 and 10. The overall width of the mold is shorter, while the height is increased to compensate for the folded configuration of the strip members. This mold configuration also allows for easy removability of the molded article carrier in that the contraction of the strip members during cooling will force the article carrier off the core members.

The mold illustrated in FIGS. 12-14 has similar elements and operates similar to the mold previously described. For example, referring to FIG. 12, die half 320 is composed in part of core members 324 and 326. A cavity 328 is located adjacent to and between core members 324 and 326. The outer surface of die 320 is defined by its sides 330 amd 332 and sides 334 and 336.

Referring to FIG. 13, the die half 322 is illustrated, which also includes a plurality of core and cavity members. For example, core member 338 is located adjacent to and between cavity members 340 and 342. Each of the core member triangular surfaces contain three convex hinge projections to form the hinges contained in the strip members of first side wall 60.

The bottom member of the article carrier 50 is formed by the mating of cores 344 and 346 and cavity 348 of die half 322, with the corresponding cavity members 350 and 352 and corresponding core members 354 of die half 320. In the process of molding the first half 84 of the article carrier 50, the die halves 320 and 322 of the molds are mated in such a way that the core members 326 and 324 are inserted into cavity members 340 and 342, respectively. When the dies are mated, side 332 of die 320 will lie adjacent to side 332' of die 322 and side 336 of die 320 will lie adjacent to side 336' of die 322. The mating of the mold dies is further illustrated in FIG. 14 which is a cross-sectional view taken along sectional line 14—14 of FIGS. 12 and 13.

Referring to FIG. 14, it can be seen that core member 326 of die 320 is inserted into cavity 340 of die 322, and cavity member 342 of die 322 receives core member 324 of die 320. The core member 338 of die 322 is positioned within the cavity member 328 of die 320. The mating of core 326 and cavity 340 produces the first central vertical strip member 134a. Core member 324 and cavity member 342 form second central horizontal strip member 136a contained in first medial wall 64. Central vertical strip member 108a in first side wall 60 is formed by the mating of core member 338 in die 322, and the corresponding cavity member 328 in die 320. Similarly, the end panels 76a and 78a and dividing walls 80a and 82a are formed in the gaps in the die created between the core and cavity members. The sides 330 and 330' of the die halves are mated along surface 356 and sides 332 and 332' are mated along surface 358. As can be seen by comparing FIG. 14 to FIG. 11, the overall width of the die is reduced to the formation of the strip members in a flexed or folded position while the overall height of the die is increased.

FIG. 15 illustrates first half 84 of article carrier 50 in the configuration in which the half is molded, using the dies shown in FIGS. 12 and 13. The strip members in first side wall 60 and first medial wall 64 are all formed in a flexed or folded position as well as the strip members in bottom member 68.

Referring to FIGS. 16–19, a second embodiment of the article container or carrier of the present invention is illustrated. The article carrier generally referred to by numeral 400 comprises a first end 402 and a second end 404 parallel to the first end 402. A first side wall generally designated as 406 is hingedly joined and extends between the first and second end walls, 402 and 404 and is perpendicular to the end walls of the article carrier 400 when the carrier is in the open position. A second side wall generally referred to as 408 is hingedly joined at the opposite side of end walls 402 and 404 and is parallel to first side wall 406.

A medial wall generally referred to as 410 is located parallel to the side walls and is positioned intermediate of the first and second side walls. A first dividing wall 412 and a second dividing wall 414 are located parallel to one another and parallel to the end walls 402 and 404. The dividing walls are located and spaced between the end walls and are perpendicular to the side walls when the article carrier 400 is in the open position. The dividing walls 412 and 414 divide the article carrier into six receiving cellular compartments for carrying beverage containers.

The article carrier 400 further includes a bottom member generally referred to as 416, which is hingedly joined to end walls 402 and 404, and a handle member generally referred to as 418. The article carrier 400 is manufactured using an injection molding process and is formed as an integral structure. Although specific elements will be identified, it must be remembered that each element is structurally molded to one another to form a single, continuous structure.

Referring to FIGS. 16 and 17, first side wall 406 includes central vertical strip members 420, 422 and 424. First vertical strip member 420 is hingedly joined to edge 426 of first end 402 and to edge 428 of first dividing wall 412. Second central vertical strip member 422 is hingedly joined and extends between first dividing wall 412 and second dividing wall 414. The second central vertical strip member 422 is joined along edge 428 of first dividing wall 412 and along edge 430 of second dividing wall 414. The third central vertical strip member 424 is hingedly joined to edge 430 of second dividing wall 414 and edge 432 of second end wall 404. Each of these central vertical strip members are further hinged at points intermediate of the ends of attachment, such that first central vertical strip member 420 includes hinge 433, second central vertical strip member 422 includes hinge 434 and third vertical strip member 424 includes hinge 436.

The second side wall 408 includes first upper vertical strip member 438 and first lower vertical strip member 440, second upper vertical strip member 442 and second lower vertical strip member 444 and third upper vertical strip member 446 and third lower vertical strip member 448. The first upper and lower vertical strip members are hingedly joined to edge 450 of second end wall 404 and to edge 452 of second dividing wall 414. The second upper and lower vertical strip members are hingedly joined to edge 452 of second dividing wall 414 and edge 454 of first dividing wall 412. Third upper and lower vertical strip members are hingedly joined to edge 454 of first dividing wall 412 and to edge 456 of first end wall 402. The three sets of upper and lower horizontal strip members are vertically displaced from one another on second side wall 408 and are offset with respect to the three central vertical strip members of first side wall 406. All upper and lower vertical strip members in second side wall 408 are hinged at points intermediate of their ends of attachment similar to the vertical strip members comprising first side wall 406.

Medial wall 410 includes first upper and lower vertical strip members 458 and 460 hingedly joined and extending between second end wall 404 and second dividing wall 414 and are vertically displaced from one another, second upper and lower vertical strip members 462 and 464 hingedly joined and extending between the second dividing wall 414 and first dividing wall 412 and third upper and lower vertical strip members 466 and 468 hingedly joined and extending between first dividing wall 412 and first end wall 402 and vertically displaced from one another. The upper and lower vertical strip members comprising medial wall 410 are vertically offset from the central vertical strip members comprising first side wall 406 and are also vertically offset from the upper and lower vertical strip members comprising second side wall 408.

FIG. 17 illustrates the relative positions of the vertical strip members comprising the side walls 406 and 408 and medial wall 410. It may be seen that there is no overlap of the vertical strip members of the side walls or medial wall to enable the article carrier 400 to be injection molded using opposing dies. FIG. 18 illustrates the bottom member 416 of article carrier 400. The bottom member 416 comprises first horizontal strip member 470 hingedly joined and extending between second end wall 404 and second dividing wall 414, second horizontal strip member 472 extending between second dividing wall 414 and first dividing wall 412 and third horizontal strip member 474 hingedly joined and extending between first dividing wall 412 and first end wall 402. The three bottom horizontal strip members 470, 472 and 474 also include a plastic living hinge intermediate of their ends of attachment, which include hinges 476, 478 and 480, respectively. These hinges as well as the hinges contained in the vertical strip members of the side walls and medial wall permit the article carrier 400 to collapse, such that the vertical strip members fold between and are contained within the end walls 402 and 404.

FIG. 19 illustrates a collapsed end view of article carrier 400 in the collapsed position, such that the side wall vertical strip members are folded and are contained within the article carrier 400, and the bottom horizontal strip members are folded and extend outwardly from the bottom of the carrier.

Article carrier 400 further includes a handle member generally referred to as 418. The handle comprises support members 482 and 484. The supporting member 482 is hingedly joined to first end wall 402 and first upper vertical strip member 458 contained in the medial wall 410. Supporting member 484 is hingedly joined to second end wall 404 and to first upper vertical member 458 contained in medial wall 410. The lifting member of handle 418 is composed of handle strip 486 which is hinged at intermediate hinge 490. The hinged attachments of handle 418 permit it to be collapsed and folded about the hinges as illustrated in FIG. 19.

Referring to FIGS. 20-24, a third embodiment of the present invention is illustrated. The article carrier, generally designated by the numeral 500, includes a first end wall generally referred to by the numeral 510 and a second end wall generally referred to by the numeral 512. A first side wall generally referred to by the numeral 514 is hingedly joined and extends between end walls 510 and 512 and is perpendicular to the end walls when the article carrier 500 is in the open position. A second side wall generally referred to by the numeral 516 is parallel to first side wall 514 and is hingedly joined and extends between opposite sides of end walls 510 and 512 and is perpendicular to the end walls 510 and 512 when the carrier is in the open position.

A first medial wall generally referred to as 518 is located parallel to first side wall 514 and is hingedly joined to end walls 510 and 512. A second medial wall 520 is located parallel to second side wall 516 and hingedly joined to end walls 510 and 512. A bottom member generally referred to by the numeral 522 is hingedly joined along the first and second side walls 514 and 516. The article carrier 500 further includes a first dividing wall member generally referred to as 524 and a second dividing wall member generally referred to as 526. The dividing walls 524 and 526 are parallel to one another and parallel to the end walls 510 and 512 of the article carrier 500. The article carrier further includes a handle member 536.

Article carrier 500 can be formed in two halves similar to the article carrier 50 described above. The first end wall 510 is composed of end panels 528a and 528b. Similarly, the second end wall 512 is composed of end panels 530a and 530b. The dividing wall members are also formed in halves such that first dividing wall member 524 is composed of first dividing walls 532a and 532b. Similarly, second dividing wall member 526 is composed of second dividing walls 534a and 534b. The article carrier 500 will be discussed in terms of a first half 538 including first side wall 514, first end panel 522a, first medial wall 518, second end panel 530a and bottom member 522. The second half of article carrier 500 will be generally referred to as 540 and includes second side wall 516, first end panel 528b, second medial wall 520, second end panel 530b and bottom member 522. Similar terminology will be used to described the figures as was employed in describing FIGS. 1-6 relating to the designation of "a" for members of first half 538 and the designation of "b" for elements of second half 540 of the article carrier 500.

Figure 20:
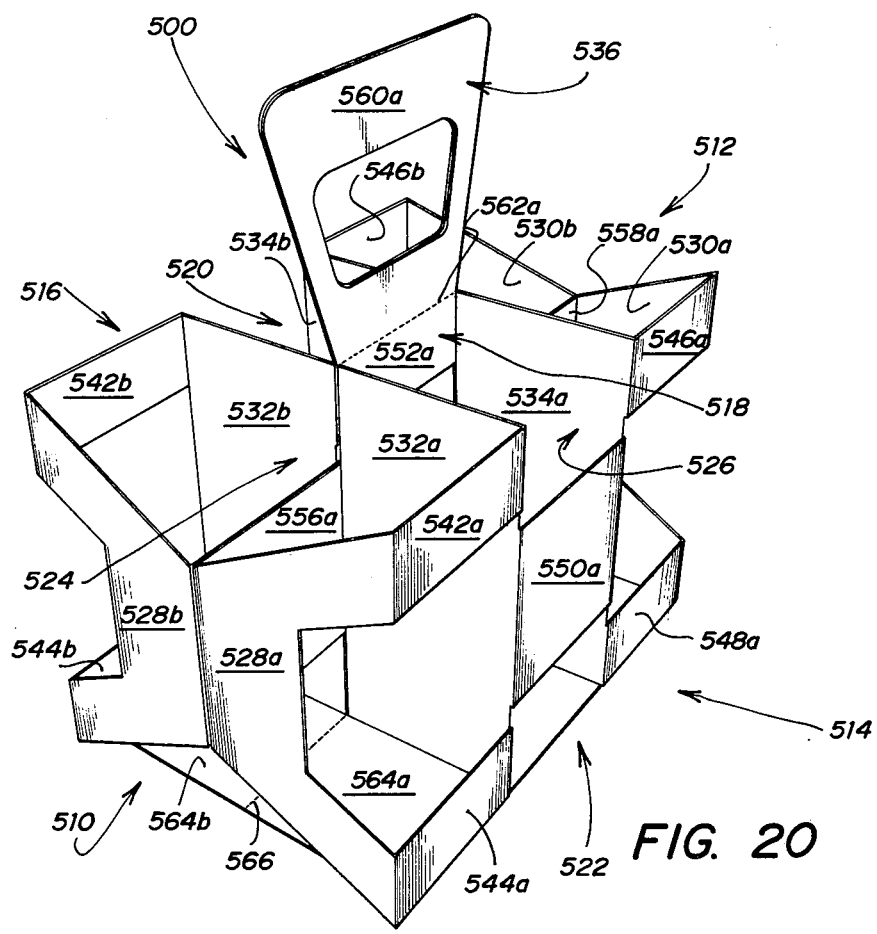
FIG. 20 is a perspective view of a third embodiment of the present invention.
Figure 21:
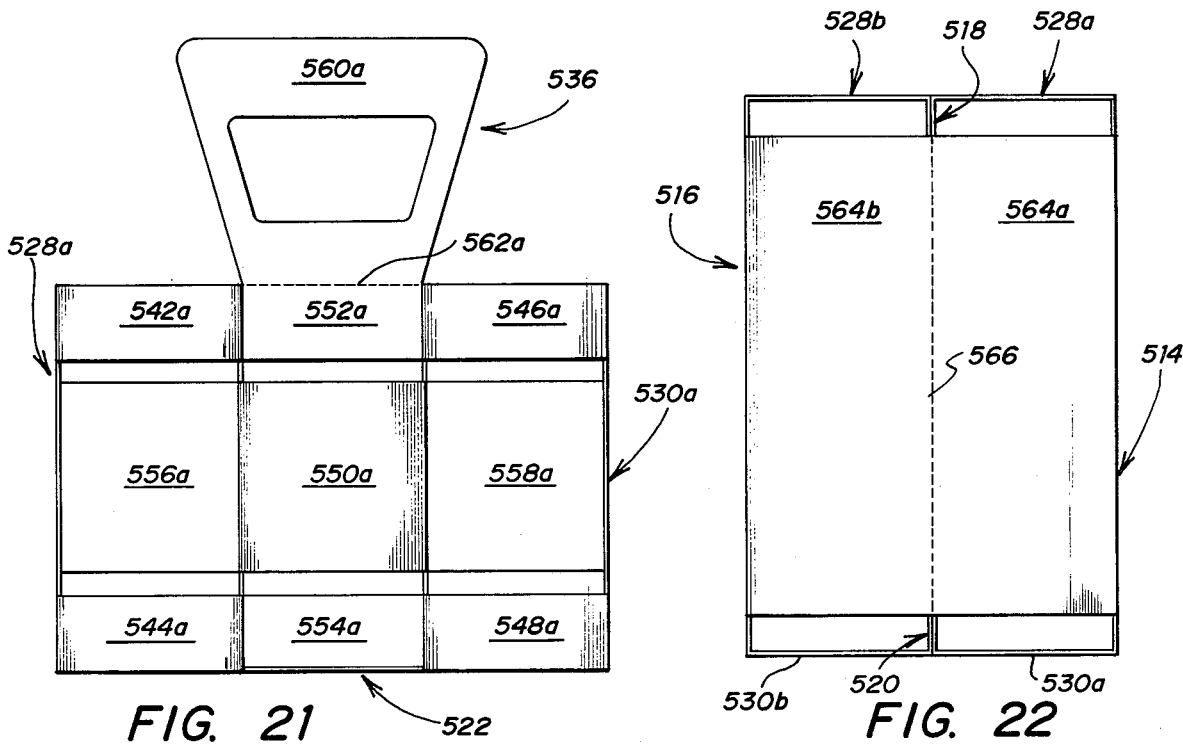
FIG. 21 is a side elevation view of a third embodiment of the present invention.

Referring to FIGS. 20 and 21, first side wall 514 is composed of first upper and lower vertical strip members 542a and 544a. These vertical strip members are vertically displaced from one another and are hingedly joined and extend between first end panel 528a and first dividing wall 532a. First side wall 514 further comprises second upper and lower vertical strip members 546a and 548a, vertically displaced from one another and parallel to first upper and lower vertical strip members 542a and 544a and hingedly joined and extending between second dividing wall 534a and second end panel 530a. A central vertical strip member 550a is centrally displaced between the upper vertical strip members 542a and 546a and the lower vertical strip members 544a and 548a and extends between first dividing wall 532a and second dividing wall 534a. The second side wall 516 is similarly configured.

The first medial wall 518 is composed of first upper and lower vertical strip members 552a and 554a, which are vertically displaced from each other and hingedly joined and extend between first dividing wall 532a and second dividing wall 534a. Medial wall 518 further includes a first central vertical strip member 556a centrally displaced from the first upper and lower vertical strip members 552a and 554a and hingedly joined and extending between first end panel 528a and first dividing wall 532a. A second central vertical strip member 558a is centrally displaced relative to first upper and lower vertical strip members 552a and 554a on first medial wall 518. Vertical strip member 558a is parallel to first central vertical strip member 556a, and is hingedly joined, and extends between second dividing wall 534a and second end panel 530a. The vertical strip members comprising first side wall 514 and the vertical strip members comprising first medial wall 518 are vertically offset from one another such that there is no overlap between the strip members of first side wall 514 and first medial wall 518. This configuration again, as in the prior embodiments, permits the article carriers to be formed using an injection molding process with opposing dies.

The handle 536 for the article carrier 500 is composed of halves 560a and 560b which are hingedly joined to the first medial wall 518 and second medial wall 520, respectively. Handle half 560a is hingedly joined along hinge 562a to the first upper vertical strip member 522a, and handle half 560b is hingedly attached along hinge 562b to the first upper vertical strip member 522b contained in second medial wall 520.

Figure 22:
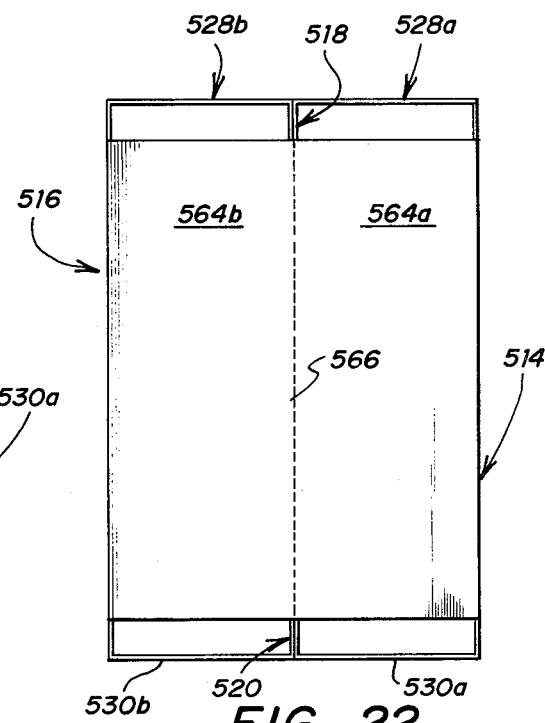
FIG. 22 is a bottom plan view of a third embodiment of the present invention.

Referring to FIG. 22, the bottom member 522 of article carrier 500 is illustrated. The bottom member 522 is composed of first bottom half 564a and second bottom half 564b. The halves are hingedly joined along hinge 566 along the center of bottom member 522. The first bottom half 564a is further hingedly joined along the bottom edges of first and second lower vertical strip members 544a and 548a contained in first side wall 514. Similarly, bottom member half 564b is hingedly joined along bottom edges of lower vertical strip members 544b and 548b contained in second side wall 516.

Referring to FIG. 23, the article carrier 500 is illustrated in the configuration in which it is molded. First half 538 and second half 540 of the article carrier 500 are symmetrical about hinge 566 contained in bottom member 522. In the open position, the halves are mechanically attached along first and second medial walls 518 and 520. This mechanical connection is affected using metal snaps or molded in plastic straps which are contained in the central vertical strip members in the medial walls 518 and 520.

Snap half 582 is centrally located on first central vertical strip member 556a and the corresponding snap half 584 is located on first central vertical strip member 556b in second medial wall 520. Similarly, snap half 586 is located on the second central vertical strip member 558a and the corresponding snap half 588 is located on second central vertical strip member 558b. The snap elements can be mechanically attached to the article carrier using rivets or can be placed individually in the die members and molded as an integral part of the article carrier. In the alternative, a plastic snap element can be molded as an integral part of the central vertical strips in the process of molding the article carrier halves. The snaps can also be located on handle halves 560a and 560b to join the handle halves into a single unit for carrying the article carrier 500.

Referring to FIG. 24, the article carrier 500 is shown in the collapsed position. The hinged bottom member and the hingedly joined vertical strip members in the side and medial walls permit the article carrier to fold and collapse into a compact volume. FIG. 24 illustrates the collapsed position of article carrier 500, such that second end panel 530a, second upper vertical strip member 546a and second lower vertical strip member 548a lie in the same plane. Second dividing wall 534a, central vertical strip member 550a and second central vertical strip member 558a contained in first medial wall 518 lie in the same plane. First dividing wall 532a lies in the same plane as first upper vertical strip member 542a and first lower vertical strip member 544a. The bottom member 522 is folded along hinge 566 such that the bottom halves 564a and 564b are contained within and between the folded side and medial walls. The handle halves 560a and 560b are folded along their respective hinges 562a and 562b and are contained within and between the folded sides and medial walls.

Figure 25:
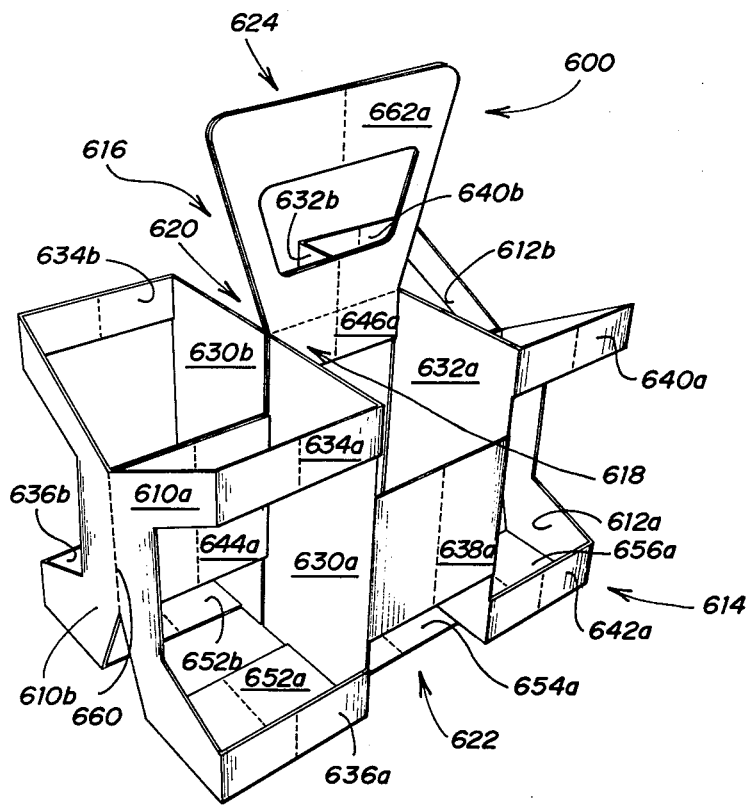
FIG. 25 is a perspective view of a fourth embodiment of the present invention.
Figure 27:
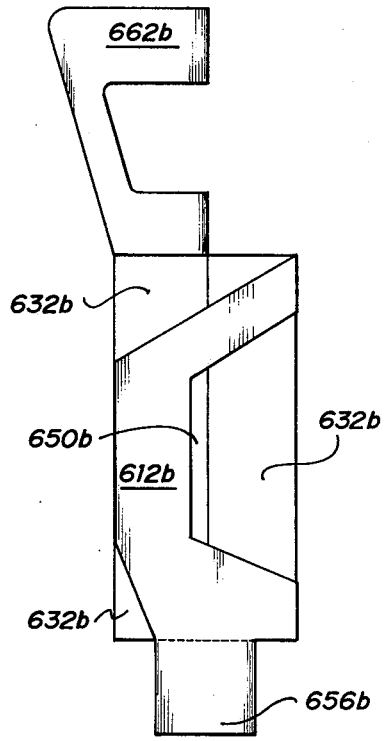
FIG. 27 is a collapsed end view of a fourth embodiment of the present invention.
Figure 26:
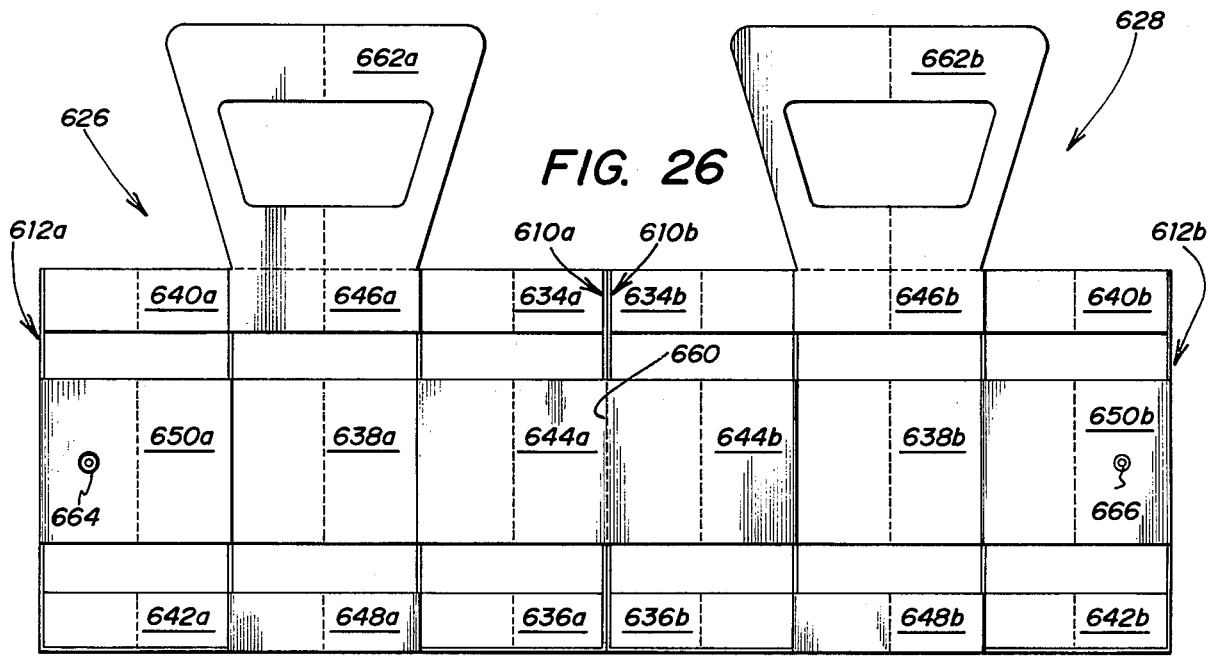
FIG. 26 is a side elevation view of a fourth embodiment of the present invention in the molded configuration.

Referring to FIGS. 25-27, a fourth embodiment of the present invention is illustrated. The plastic collapsible article carrier is generally referred to by numeral 600, and comprises a first end panel 610a and a second end panel 612a parallel to the first end panel. First side wall 614 is hingedly joined to and extends between the end panels 610a and 612a and is perpendicular to the end panels when the article carrier is in the open position. A second side wall 616 is parallel to the first side wall 614 and is hingedly joined to and extends between the opposite side of first end panel 610b and second end panel 612b. The carrier further includes a first medial wall 618, which is hingedly joined to the end panels 610a and 610b and parallel to first side wall 614 when the carrier is in the open position. A second medial wall 620 is hingedly joined to and extends between end panels 610b and 612b and is disposed in a side-by-side relationship with first medial wall 618. The carrier 600 further includes a bottom member generally referred to by numeral 622 and a handle member generally referred to by the numeral 624.

The article carrier 600 is molded in halves similar to article carrier 50 as previously described. Article carrier 600 is composed of a first half 626 comprising first end panel 610a, first side wall 614, second end panel 612a, medial wall 618 and bottom member 622. The second half 628 of article carrier 600 comprises first end panel 610b, second side wall 616, second end panel 612b, second medial wall 620 and bottom member 622. The first half 626 is divided into three cellular compartments using first and second dividing walls 630a and 632a. Similarly, second half 628 of the article carrier 600 is divided into three cellular compartments using first and second dividing walls 630b and 632b.

First side wall 614 includes first upper and first lower vertical strip members 634a and 636a, central vertical strip member 638a and second upper and second lower vertical strip members 640a and 642a. These vertical strip members are hingedly joined to and extend between the end panels and dividing walls as similarly described in previous embodiments. The first medial wall 618 comprises first central vertical strip member 644a, first upper and first lower vertical strip members 646a and 648a and second central vertical strip member 650a. The bottom member 622 comprises first horizontal strip member 652a, second horizontal strip member 654a and third horizontal strip member 656a. The second side wall 616, second medial wall 620 and bottom member 622 of second half 628 are similarly formed. All strip members are further hinged intermediate of their edges of attachment.

Referring to FIG. 26, the configuration in which the article carrier is molded is illustrated. First half 626 is parallel to second half 628 and the halves contact each other along first end panel 610a and first end panel 610b. The halves 626 and 628 are hingedly joined along hinge 660 joining first end panels 610a and 610b. FIG. 26 also illustrates handle member 624, composed of handle 662a and 662b, which are centrally hinged and hingedly joined to medial walls 618 and 620, respectively. Alternatively, handle member 624 may be composed of either one of handles 662a and 662b. The halves 626 and 628 of article carrier 600 are mechanically fastened using snaps 664 and 666 as previously described with respect to article carrier 500 illustrated in FIG. 23.

FIG. 27 illustrates a collapsed end view of article carrier 600 in the collapsed position. The vertical strips have been folded and are contained within and between the end panels and dividing walls.

Figure 28:
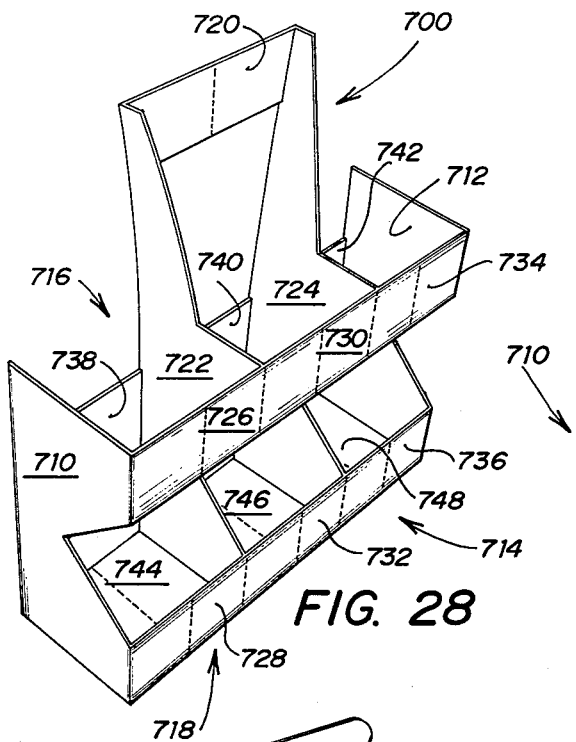
FIG. 28 is a perspective view of a fifth embodiment of the present invention.
Figure 29:
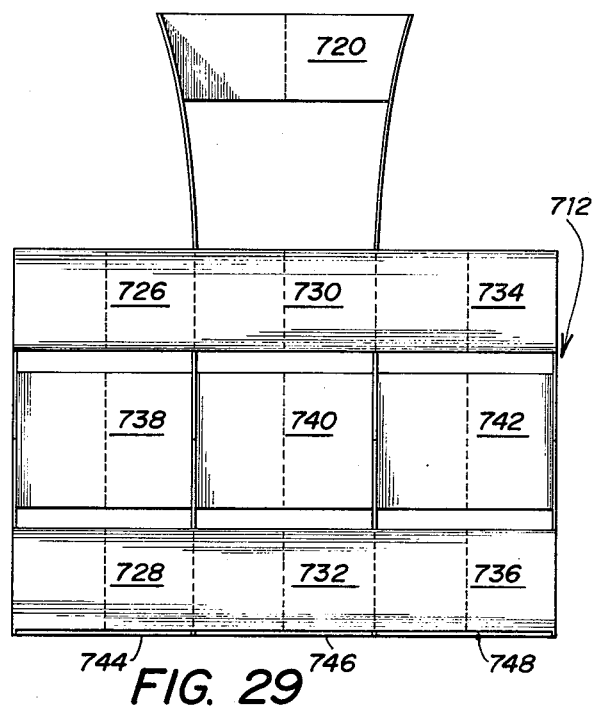
FIG. 29 is a side elevation view of a fifth embodiment of the present invention.

Referring to FIGS. 28 and 29, a fifth embodiment of the present invention is illustrated and generally referred to by numeral 700. The article carrier 700 is composed of a first end wall 710 and a second end wall 712 parallel to the first end wall. First side wall 714 is hingedly joined to and extends between end walls 710 and 712 and is perpendicular to the end walls when the carrier 700 is in the open position. A second side wall 716 is hingedly joined to and extends between opposite sides of the end walls 710 and 712 and is parallel to the first side wall 714. The article carrier further includes a bottom member 718 and a handle member 720. The article carrier 700 is divided into three cellular compartments using a first dividing wall 722 and a second dividing wall 724, parallel to the end walls and hingedly joined between the first side wall 714 and the second side wall 716.

First side wall 714 comprises first upper vertical strip member 726, first lower vertical strip member 728, second upper vertical strip member 730, second lower vertical strip member 732, third upper strip member 734 and third lower vertical strip member 736. These vertical strip members are hingedly joined and extend between the end walls and dividing walls as similarly described in the previous embodiments. The second side wall 716 comprises first central vertical strip member 738, second central vertical strip member 740 and third central vertical strip member 742. The vertical strip members comprising second side wall 716 are intermediately hinged and are vertically offset from the vertical strip members comprising first side wall 714, such that the article carrier 700 can be injection molded using opposing dies.

The bottom member 718 comprises first horizontal strip member 744 hingedly joined and extending between first end wall 710 and first dividing wall 722, second horizontal strip member 746 hingedly joined and extending between first dividing wall 722 and second dividing wall 724, and third horizontal strip member 748 hingedly joined and extending between second dividing wall 724 and second end wall 712.

All of the vertical strip members contained in first side wall 714 and second side wall 716 are hinged intermediate of their edges of attachment to the end walls and dividing walls. The horizontal strip members comprising bottom member 718 are also hinged intermediate of their points of attachment to permit the article carrier 700 to be folded and collapsed in a manner similar to that previously described with respect to article carrier 50.

Figure 30:
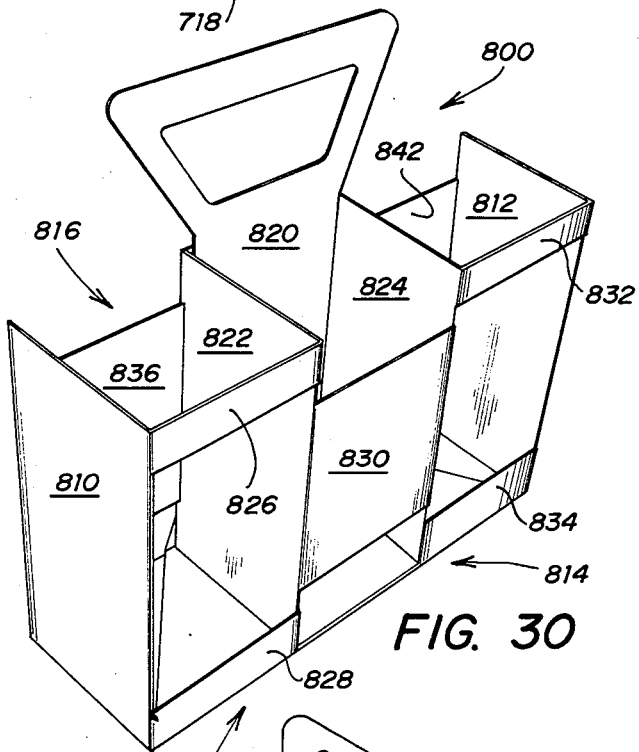
FIG. 30 is a perspective view of a sixth embodiment of the present invention.
Figure 31:
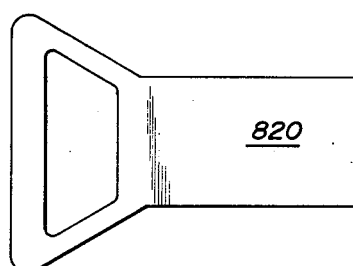
FIG. 31 is a side elevation view of a sixth embodiment of the present invention in the molded configuration.
Figure 32:
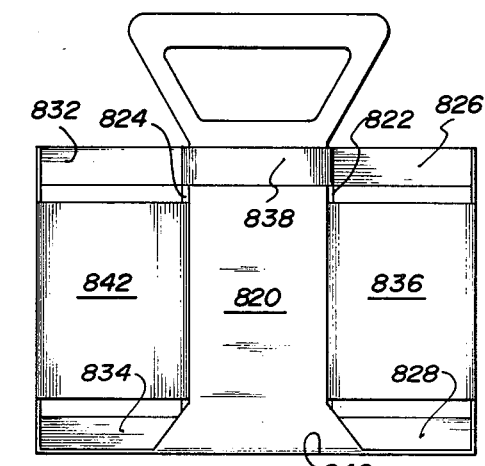
FIG. 32 is a side elevation view of a sixth embodiment of the present invention in the assembled position.

Referring now to FIGS. 30-32, a sixth embodiment of the present invention is illustrated and generally referred to by numeral 800. The article carrier 800 comprises a first end wall 810 and a second end wall 812, such that the end walls are parallel to one another. A first side wall 814 is hingedly joined to and extends between end walls 810 and 812 and is perpendicular to the end walls when the article carrier 800 is in the open position. A second side wall 816 is hingedly joined to and extends between opposite sides of the end walls 810 and 812 and is parallel to the first side wall 814. The article carrier 800 further includes a bottom member 818 and a handle member 820. The article carrier 800 is divided into three cellular compartments using dividing walls 822 and 824 hingedly joined and extending between the first side wall 814 and second side wall 816.

The first side wall 814 comprises first upper vertical strip member 826, first lower vertical strip member 828, central vertical strip member 830, second upper vertical strip member 832 and second lower vertical strip member 834. The second side wall 816 comprises first central vertical strip member 836, first upper vertical strip member 838, first lower vertical strip member 840 and second central vertical strip member 842. The vertical strip members are hingedly joined and extend between the end walls and dividing walls of the article carrier as previously described with respect to article carrier 500 illustrated in FIG. 20.

Referring to FIG. 31, the bottom member 818 is hingedly joined along the bottom edge of second lower vertical strip member 834 along hinge 844, and is further hingedly joined along hinge 846 to the bottom edge of first lower vertical strip member 828. The handle member 820 is hingedly joined along hinge 848 to the bottom member 818. The article carrier 800 is foldable about the hinged attachments and folds to a configuration similar to that of article carrier 500 illustrated in FIGS. 20 and 23.

FIG. 32 illustrates the location of handle member 820 when the carrier 800 is in use. Handle member 820 is inserted between dividing walls 822 and 824 by flexing the upper portion of handle member 820, and placing its upper portion below first upper vertical strip member 838. The handle member 820 is then extended upward until the bottom member 818 is perpendicular to the end and dividing walls. To collapse the article carrier 800 the upper portion of handle member 820 is flexed and pushed down, below first upper vertical strip member 830 and removed from between the dividing walls 822 and 824.

Figures 33, 36, 37:
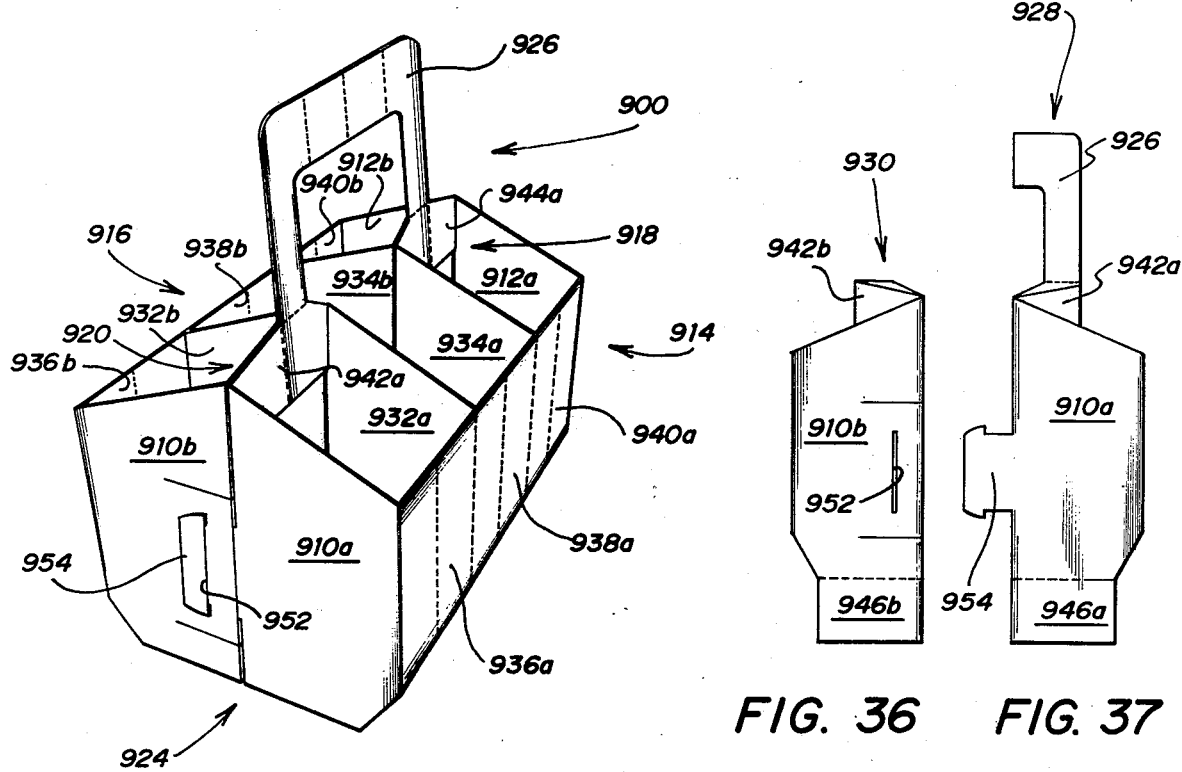
FIG. 33 is a perspective view of a seventh embodiment of the present invention.
FIG. 36 is a collapsed end view of a seventh embodiment of the present invention.
FIG. 37 is a collapsed end view of a seventh embodiment of the present invention.

Referring now to FIG. 33, a seventh embodiment of the present invention is illustrated and generally designated by numeral 900. The article carrier 900 is formed in halves similar to article carrier 600 illustrated in FIGS. 25-27. Article carrier 900 comprises a first end wall 910a and a second end wall 912a parallel to the first end wall 910a. A first side wall 914 is hingedly joined and extends between end wall 910a and 912a and is perpendicular to the end walls when the article carrier is in the open position. A second side wall 916 is hingedly joined and extends between the opposite sides of end walls 910b and 912b and is perpendicular to the end walls when the article carrier is in the open position.

A first medial wall 918 is located parallel to first side wall 914 and is hingedly joined and extends between first and second end walls 910a and 912a. A second medial wall 920 is parallel to second side wall 916 and is hingedly joined and extends between first end wall 910b and second end wall 912b, and is disposed in a side-by-side relationship with first medial wall 918. The article carrier 900 further includes a bottom member 924 and a handle member 926.

The article carrier 900 can be seen to be constructed in halves. A first half 928 comprises first end wall 910a, first side wall 914, second end wall 912a, first medial wall 918 and bottom member 924. A second half 930 of article carrier 900 comprises first end wall 910b, second side wall 916, second end wall 912b, second medial wall 920 and bottom member 924. Each half of the article carrier is divided into three cellular compartments. The compartments are formed using first dividing wall 932a hingedly joined and extending between first side wall 914 and first medial wall 918, and a second dividing wall 934a similarly joined to first side wall 914 and first medial wall 918. The second half 930 of article carrier 900 is divided into three cellular compartments using first dividing wall 932b and second dividing wall 934b.

First side wall 914 comprises first vertical strip member 936a hingedly joined and extending between first end wall 910a and first dividing wall 932a, second vertical strip member 938a hingedly joined and extending between first dividing wall 932a and second dividing wall 934a and third vertical strip member 940a hingedly joined and extending between second dividing wall 934a and second end wall 912a. First medial wall 918 comprises first vertical strip member 942a hingedly joined and extending between first end wall 910a and first dividing wall 932a and a second vertical strip member 944a hingedly joined and extending between second dividing wall 934a and second end wall 912a. Second side wall 916 and second medial wall 920 of second half 930 are similarly constructed.

Figures 34, 35:
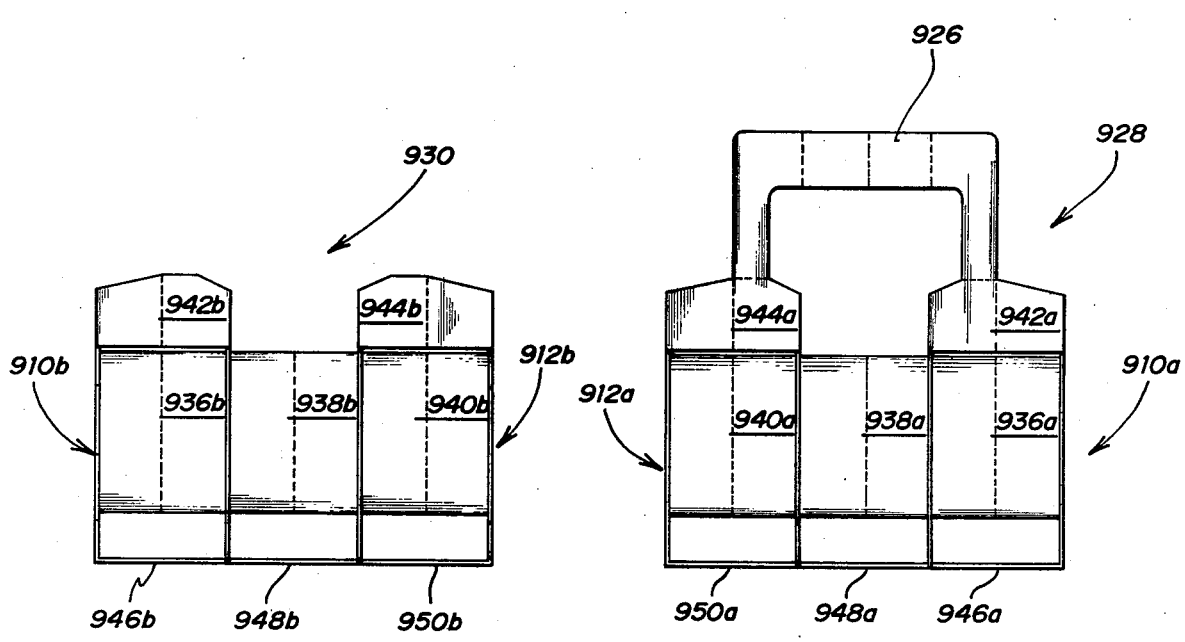
FIG. 34 is a side elevation view of a seventh embodiment of the present invention.
FIG. 35 is a side elevation view of a seventh embodiment of the present invention.

The vertical strip members of first side wall 914 and the vertical strip members of first medial wall 918 are vertically offset to facilitate molding of the half using an injection molding process with opposed dies in a manner as described previously. As illustrated in FIGS. 34 and 35, the bottom member 924 is composed of horizontal strip members 946a and 946b, 948a and 948b and 950a and 950b. All strip members are hingedly attached and hinged intermediate of their ends of attachment, such that the article carrier can be folded and collapsed about the hinges to a collapsed position as shown in FIGS. 36 and 37.

A handle member 926 is hingedly joined to first and second vertical strip members 942a and 944a contained in first medial wall 918. The handle member 926 is further hinged at points intermediate of its ends to permit the handle member to fold and collapse as shown in FIG. 37.

Referring to FIGS. 36 and 37, first end wall 910b further includes a slotted aperture 952 to receive a tabbed projection 954 projecting from first end 910a. The mating of tab 954 and slot 952 provide a mechanical attachment between first half 928 and second half 930 of the article carrier 900. A corresponding tab is located on second end wall 912a of first half 928 and a similar slotted aperture if located on second end wall 912b of half 930 of the article carrier 900. The halves of the article carrier can be individually folded for shipment and storage or the article carrier 900 can be assembled and folded for shipment and storage.

It will thus be seen that the present invention provides for a plastic collapsible article carrier than can be economically manufactured by the injection molding of plastic within opposing dies. The article carrier is structurally sound, lightweight and can be folded for ease in storage and transportation. The plastic collapsible article carrier of the present invention can be recycled and has a useful life that is longer than carriers associated with the prior art.

Whereas the present invention has been described with respect to specific embodiments thereof, it will be understood that various changes and modifications will be suggested to one skilled in the art, and it is intended to encompass such changes and modifications as fall within the scope of the appended claims.

What is claimed is:

1. An injection molded plastic collapsible article carrier having open and collapsed positions and formed from two half sections which are hinged together, wherein each half section comprises:
   first and second end walls parallel to one another when the carrier is in the open position;
   first and second side walls parallel to one another and hingedly joined to edges of said first and second end walls to extend perpendicularly to said first and second end walls when the carrier is in the open position, portions of said side walls having heights less than the height of said end walls and portions of said first side wall being vertically spaced from portions of said second side wall, such that said portions of said first side wall are vertically offset from said portions of said second side wall to enable molding thereof in opposed dies;
   first and second dividing walls, parallel to one another and parallel to said end walls, being hingedly joined at spaced locations between said first and second side walls to form a plurality of receiving cellular compartments between said first and second side walls within the collapsible article carrier; and
   a bottom member hingedly joined to edges of at least one of said walls, wherein the collapsible article carrier may be folded about said hinged attachments to a flat collapsed position and folded to the open position to form a plurality of open ended cellular compartments for receiving articles.

2. The injection molded plastic collapsible article carrier according to claim 1 wherein said first side wall compises:
   first upper and lower vertical strip members vertically displaced from one another and hingedly joined at the ends thereof to edges of said first end wall and said first dividing wall;
   second upper and lower vertical strip members vertically displaced from one another and parallel to said first upper and lower vertical strip members, said second upper and lower vertical strip members joined at the ends thereof to edges of said second dividing wall and said second end wall; and
   a central vertical strip member vertically displaced and interposed between said first and second upper and lower vertical strip members and hingedly joined at the ends thereof to edges of said first dividing wall and said second dividing wall.

3. The injection molded plastic collapsible article carrier according to claim 2 wherein said second side wall comprises:
   upper and lower vertical strip members vertically displaced from one another and offset relative to said central vertical strip member of said first side wall and hingedly joined at the ends thereof to edges of said first dividing wall and second dividing wall;
   a first central vertical strip member vertically offset relative to said first upper and lower vertical strip members of said first side wall and interposed between said first upper and lower vertical strip members of said first side wall and hingedly joined at the ends thereof to edges of said first end wall and first dividing wall; and
   a second central vertical strip member vertically offset relative to said second upper and lower vertical strip members of said first side wall and interposed between said second upper and lower vertical strip members of said first side wall and parallel to said first central vertical strip member of said second side wall and hingedly joined at the ends thereof to edges of said second dividing wall and said second end wall.

4. The injection molded plastic collapsible article carrier according to claim 3 wherein said bottom member is hingedly joined along a first edge to said lower vertical strip members of said first side wall, such that the collapsible article carrier may be folded about said hinged attachments to the flat collapsed position in which said bottom member and said walls are parallel to one another.

5. The injection molded plastic collapsible article carrier according to claim 4 wherein said halves are hingedly joined along a second edge of said bottom member.

6. The injection molded plastic collapsible article carrier according to claim 5 further including a handle member hingedly joined to said upper vertical strip member of said second side wall, said handle member being foldable about said hinged attachments to a collapsed position.

7. The injection molded plastic collapsible article carrier according to claim 3 wherein said strip members are hinged intermediate of edges of attachment to said walls.

8. The injection moldd plastic collapsible article carrier according to claim 7 wherein said bottom member comprises:
- a first horizontal bottom strip member hingedly joined at the ends thereof to bottom edges of said first end wall and said first dividing wall and hinged intermediate of said ends of attachment;
- a second horizontal bottom strip member hingedly joined at the ends thereof to bottom edges of said first dividing wall and said second dividing wall and hinged intermediate of said ends of attachment; and
- a third horizontal bottom strip member hingedly joined at the ends thereof to bottom edges of said second dividing wall and said second end wall and hinged intermediate of said ends of attachment, wherein the collapsible article carrier may be folded about said hinged bottom attachments to a flat collapsed position in which said end walls contact said dividing walls.

9. The injection molded plastic collapsible article carrier according to claim 8 wherein said half sections are hingedly joined between said first and second dividing walls of said first half section and said first and second dividing walls of said second half section.

10. The injection molded plastic collapsible article carrier according to claim 9 further including a handle member hingedly joined to said first and second dividing walls and hinged intermediate of its sides, said handle member being foldable about said hinged attachments to a flat collaped position when the article carrier is in the collapsed position.

11. The injection molded plastic collapsible article carrier according to claim 8 wherein said halves are hingedly joined along said first end wall of said first half and said second end wall of said second half.

12. The injection molded plastic collapsible article carrier according to claim 11 further including a handle member hingedly joined to said upper vertical strip member of said second side wall and hinged intermediate of its sides, said handle member being foldable about said hinged attachments to a collapsed position.

13. The injection molded plastic collapsible article carrier according to claim 1 wherein said first side wall comprises:
- a first vertical strip member hingedly joined and extending between edges of said first end wall and said first dividing wall;
- a second vertical strip member, parallel to said first vertical strip member, and hingedly joined and extending between edges of said first dividing wall and said second dividing wall; and
- a third vertical strip member, parallel to said second vertical strip member, and hingedly joined and extending between edges of said second dividing wall and said second end wall.

14. The injection molded plastic collapsible article carrier according to claim 13 wherein said second side wall comprises:
- a first vertical strip member hingedly joined and extending between edges of said first end wall and said first dividing wall, such that said first vertical strip member is vertically offset from said first vertical strip member of said first side wall; and
- a second vertical strip member hingedly joined and extending between edges of said second end wall and said second dividing wall, such that said second vertical strip member is vertically offset from said third vertical strip member of said first side wall, and said side walls are vertically offset to enable molding thereof in opposing dies and the article carrier may be folded about said hinged attachments to a flat collapsed position.

15. The injection molded plastic collapsible article carrier according to claim 14 wherein said strip members are hinged intermediate of edges of attachment to said walls.

16. The injection molded plastic collapsible article carrier according to claim 15 wherein said bottom member comprises:
- a first horizontal bottom strip member hingedly joined and extending between bottom edges of said first end wall and said first dividing wall and hinged intermediate of edges of attachment;
- a second horizontal bottom strip member hingedly joined and extending between bottom edges of said first dividing wall and said second dividing wall and hinged intermediate of edge of attachment; and
- a third horizontal bottom strip member hingedly joined and extending between bottom edges of said second dividing wall and said second end wall and hinged intermediate of edges of attachment, such that the collapsible article carrier may be folded about said hinged bottom attachments to a flat collapsed position in which said end walls contact said dividing walls.

17. The injection molded plastic collapsible article carrier according to claim 16 wherein said end walls of the halves further include a receiving means for joining the halves of the carrier.

18. The injection molded plastic collapsible article carrier according to claim 17 further including a handle member hingedly joined to said first and second vertical strip members of said second side wall and hinged intermediate of its sides, said handle member being foldable about said hinged attachments to a collapsed position.

* * * * *

UNITED STATES PATENT AND TRADEMARK OFFICE
CERTIFICATE OF CORRECTION

PATENT NO. : 4,113,087
DATED : September 12, 1978
INVENTOR(S) : Paul J. Morcom

It is certified that error appears in the above-identified patent and that said Letters Patent are hereby corrected as shown below:

Column 2, line 15, change "portion" to --position--;
Column 6, line 24, change "104a" to --140a--;
Column 9, line 60, change "(0.017/inch)" to --(.0175"/inch)--;
Column 21, line 1, change "moldd" to --molded--;
Column 22, line 35, change "edge" to --edges--.

Signed and Sealed this

Nineteenth Day of June 1979

[SEAL]

Attest:

RUTH C. MASON
Attesting Officer

DONALD W. BANNER
Commissioner of Patents and Trademarks